(12) United States Patent
Shinkai et al.

(10) Patent No.: US 9,052,546 B2
(45) Date of Patent: Jun. 9, 2015

(54) ILLUMINATION UNIT AND DISPLAY

(75) Inventors: Shogo Shinkai, Miyagi (JP); Kentaro Okuyama, Miyagi (JP); Tomoaki Suzuki, Miyagi (JP); Akira Ebisui, Miyagi (JP); Yuji Takahashi, Miyagi (JP); Taizo Nishimura, Miyagi (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 13/515,763

(22) PCT Filed: Oct. 13, 2011

(86) PCT No.: PCT/JP2011/073486
§ 371 (c)(1),
(2), (4) Date: Jun. 13, 2012

(87) PCT Pub. No.: WO2012/053411
PCT Pub. Date: Apr. 26, 2012

(65) Prior Publication Data
US 2012/0257139 A1    Oct. 11, 2012

(30) Foreign Application Priority Data
Oct. 20, 2010 (JP) ................................. 2010-235926

(51) Int. Cl.
G02F 1/1335    (2006.01)
F21V 7/04     (2006.01)

(52) U.S. Cl.
CPC ............... *G02F 1/133615* (2013.01); *G02F 2001/133601* (2013.01)

(58) Field of Classification Search
CPC ...... G02B 5/30; G02B 6/0083; G02B 6/0056; G02B 6/0061; G02B 6/0063; G02F 1/133615; G02F 1/133524

USPC ............................... 349/61–62; 362/623–625
See application file for complete search history.

(56) References Cited

U.S. PATENT DOCUMENTS

| | | | |
|---|---|---|---|
| 2007/0268427 A1* | 11/2007 | Uehara | 349/62 |
| 2008/0130316 A1* | 6/2008 | Kinoshita et al. | 362/620 |
| 2008/0205083 A1* | 8/2008 | Sumiyoshi et al. | 362/619 |
| 2010/0171903 A1* | 7/2010 | Okuyama | 349/65 |

FOREIGN PATENT DOCUMENTS

| | | |
|---|---|---|
| JP | 6-347790 | 12/1994 |
| JP | 7-199184 | 8/1995 |
| JP | 2000-171783 | 6/2000 |
| JP | 2001-042329 | 2/2001 |
| JP | 2001-318367 | 11/2001 |
| JP | 2002-023160 | 1/2002 |
| JP | 2008-021659 | 1/2008 |

* cited by examiner

*Primary Examiner* — Nathanael R Briggs
(74) *Attorney, Agent, or Firm* — K&L Gates LLP

(57) ABSTRACT

There are provided an illumination unit and a display which are capable of further uniformizing chromaticity of illumination light in a plane while suppressing a reduction in light extraction efficiency. A light modulation device bonded to a light guide plate includes a light modulation layer exhibiting a scattering property or transparency with respect to light propagating through the light guide plate. The light modulation layer is sandwiched between a pair of transparent substrates. While alignment films controlling alignment of the light modulation layer are disposed on surfaces of the transparent substrates, an electrode generating an electric field which changes the alignment of the light modulation layer is disposed on only the surface of the transparent substrate.

16 Claims, 22 Drawing Sheets

ILLUMINATION UNIT AND DISPLAY

CROSS REFERENCES TO RELATED APPLICATIONS

The present application is a national stage of International Application No. PCT/JP2011/073486 filed on Oct. 13, 2011 and claims priority to Japanese Patent Application No. 2010-235926 filed on Oct. 20, 2010, the disclosure of which is incorporated herein by reference.

BACKGROUND

The present invention relates to an illumination unit and a display which each include a light modulation device exhibiting a scattering property or transparency with respect to light.

In recent years, improvements in image quality and energy conservation of liquid crystal displays have been accelerated, and systems achieving an improvement in dark-room contrast by modulating light intensity in a partial region of a backlight have been proposed. As a main technique of achieving an improvement in dark-room contrast, some of light-emitting diodes (LEDs) used as light sources of a backlight are driven to modulate backlight light based on a display image. Moreover, in large-screen liquid crystal displays, as in the case of small-screen liquid crystal displays, a reduction in profile has been strongly desired; therefore, attention has been given not to a system in which cold cathode fluorescent lamps (CCFLs) or LEDs are disposed directly below a liquid crystal panel, but to an edge light system in which a light source is disposed on an edge of a light guide plate. However, in the edge light system, it is difficult to perform a partial drive to modulate light intensity in a partial region of the light source.

CITATION LIST

Patent Literature

[PTL 1] Japanese Unexamined Patent Application Publication No. H6-347790

SUMMARY

As a technique of extracting light propagating through a light guide plate, for example, PTL 1 proposes a display using a polymer dispersed liquid crystal (PDLC) allowed to switch between a transmission state and a scattering state. This technique is proposed to reduce glare or the like, and is a technique of switching between the transmission state and the scattering state by applying a voltage to a partial region of the PDLC. However, in a backlight in PTL 1, there is an issue that light absorption by an electrode is considerably large, and light extraction efficiency is not increased much. Moreover, in the backlight, there is an issue that as light absorption by the electrode has wavelength dependence, chromaticity of illumination light varies with increasing distance from a light source mounted on an edge of a light guide plate.

The present invention is made to solve the above-described issues, and it is an object of the invention to provide an illumination unit and a display which are capable of further uniformizing chromaticity of illumination light in a plane while suppressing a reduction in light extraction efficiency.

An illumination unit of the invention includes a first transparent substrate and a second transparent substrate disposed to be separated from and face each other and a light source emitting light to an end surface of the first transparent substrate or the second transparent substrate. The illumination unit further includes an electrode disposed on a surface of the first transparent substrate or the second transparent substrate and generating an electric field in a direction parallel to the surface of the first transparent substrate, and a light modulation layer disposed in a gap between the first transparent substrate and the second transparent substrate and exhibiting a scattering property or transparency with respect to light from the light source, depending on magnitude of the electric field.

A display of the invention includes a display panel including a plurality of pixels arranged in a matrix and being driven based on an image signal, and an illumination unit illuminating the display panel. The illumination unit included in the display includes the same components as those in the above-described illumination unit.

In the illumination unit and the display of the invention, the electrode is disposed on only the surface of one of the first transparent substrate and the second transparent substrate allowing the light modulation layer to be sandwiched therebetween. Therefore, a light absorption amount by the electrode when light emitted from the light source repeatedly passes through the electrode in the light modulation device while propagating through the light guide plate is smaller, compared to the case where the electrodes are disposed on the surfaces of both of the transparent substrates in the light modulation device. Further, as the light absorption amount by the electrode is small, a change in chromaticity of illumination light in a plane is also small.

In the illumination unit and the display of the invention, the electrode may be configured of a first electrode having comb teeth which extend in a first direction and a second electrode having comb teeth which are disposed alternately with the comb teeth of the first electrode. The first direction here may be parallel to a side surface facing the light source of side surfaces of the first transparent substrate or may be parallel to a normal to a side surface facing the light source of side surfaces of the first transparent substrate.

According to the illumination unit and the display of the invention, the electrode is disposed on only the surface of one of the first transparent substrate and the second transparent substrate allowing the light modulation layer to be sandwiched therebetween; therefore, the light absorption amount by the electrode and a change in chromaticity of illumination light in a plane are allowed to be reduced. As a result, chromaticity of illumination light in a plane is allowed to be further uniformized while suppressing a reduction in light extraction efficiency.

Additional features and advantages are described herein, and will be apparent from the following Detailed Description and the figures.

DETAILED DESCRIPTION

Embodiments of the invention will be described in detail below referring to the accompanying drawings. It is to be noted that description will be given in the following order.

Figure 1:
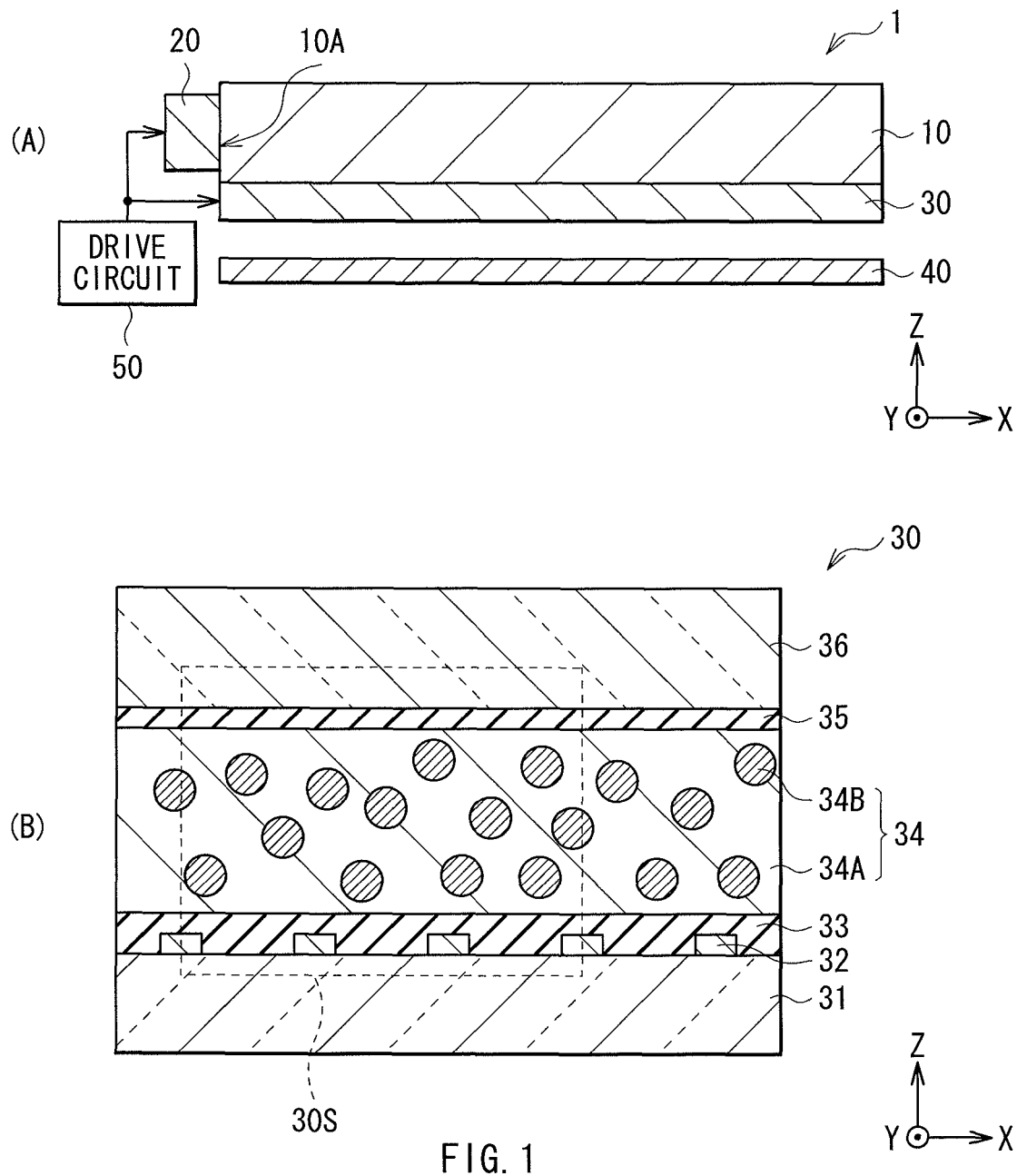
FIG. 1 is a sectional view illustrating an example of a configuration of a backlight according to a first embodiment of the invention.
Figure 2:
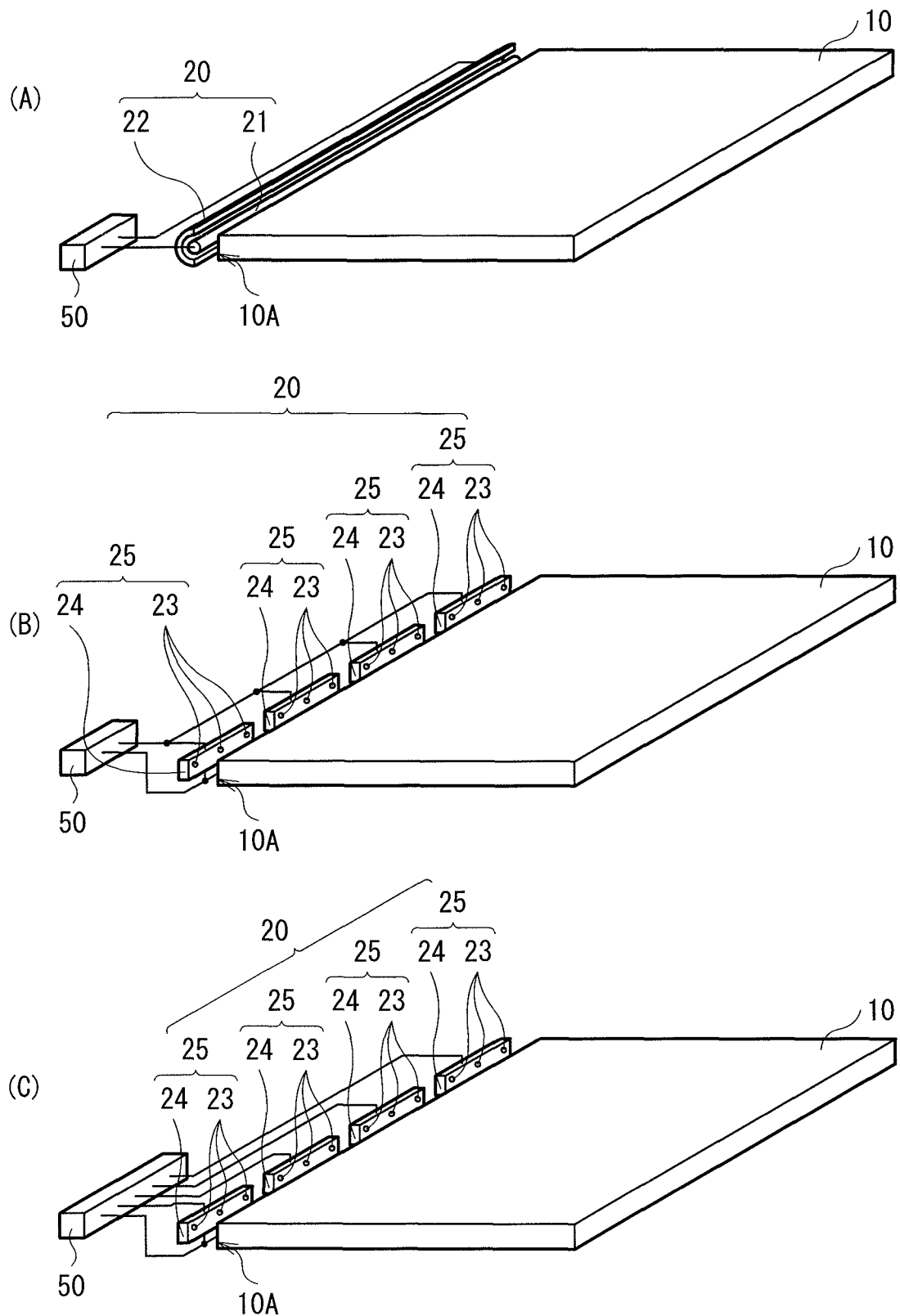
FIG. 2 is a perspective view illustrating an example of a configuration of a light source in FIG. 1.
Figure 3:
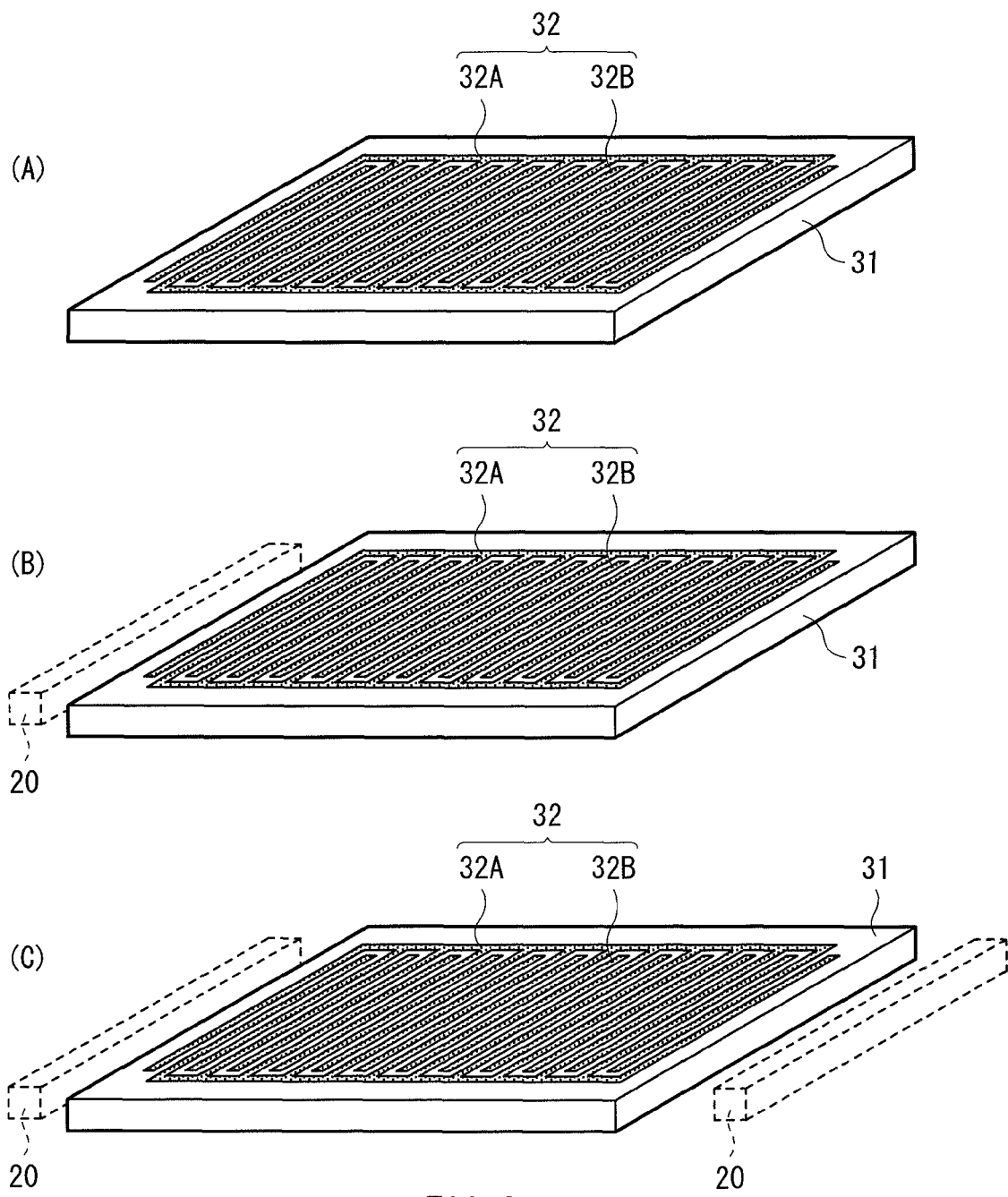
FIG. 3 is a perspective view illustrating an example of a configuration of an electrode in FIG. 1.
Figure 4:
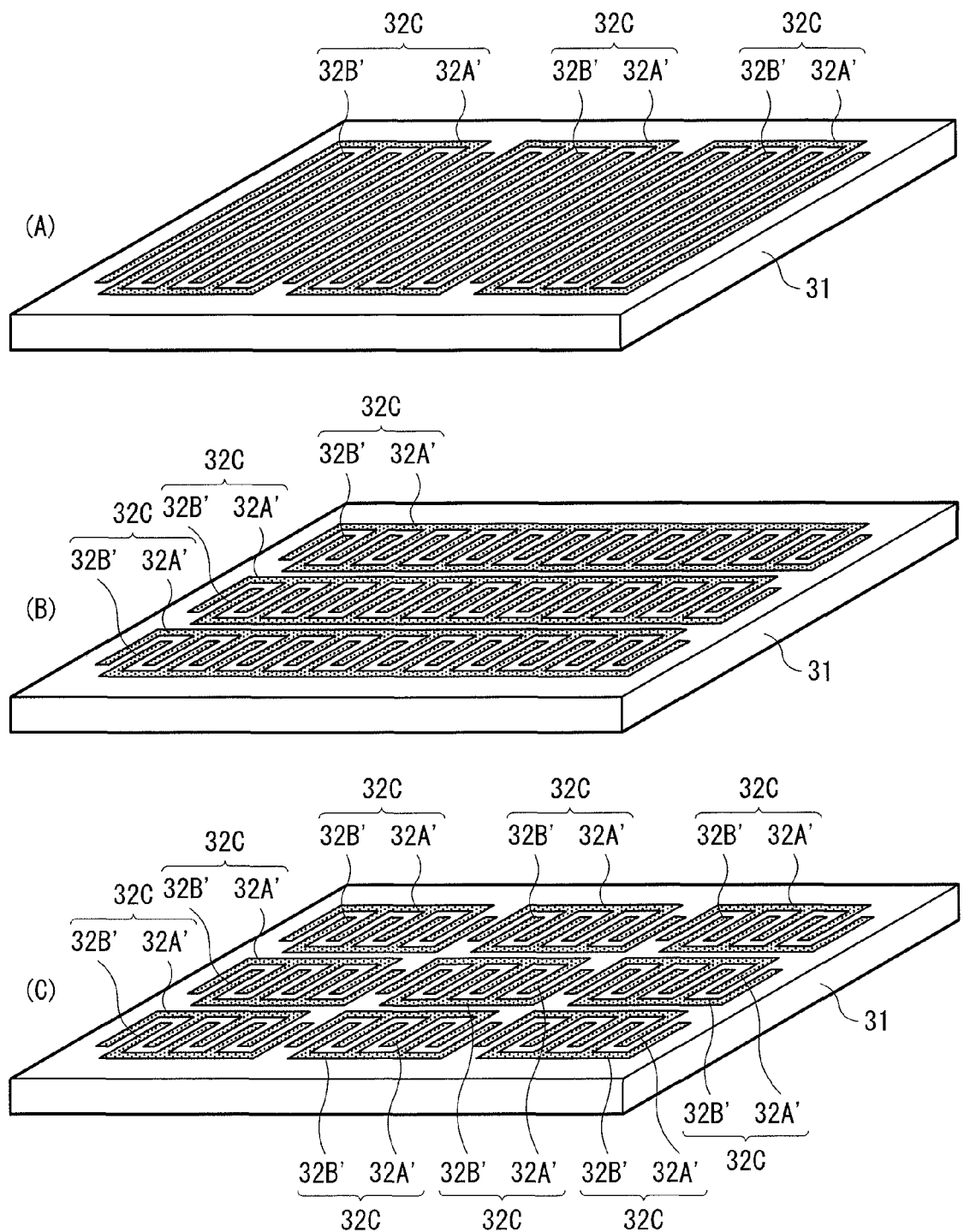
FIG. 4 is a perspective view illustrating another example of the configuration of the electrode in FIG. 3.
Figure 12:
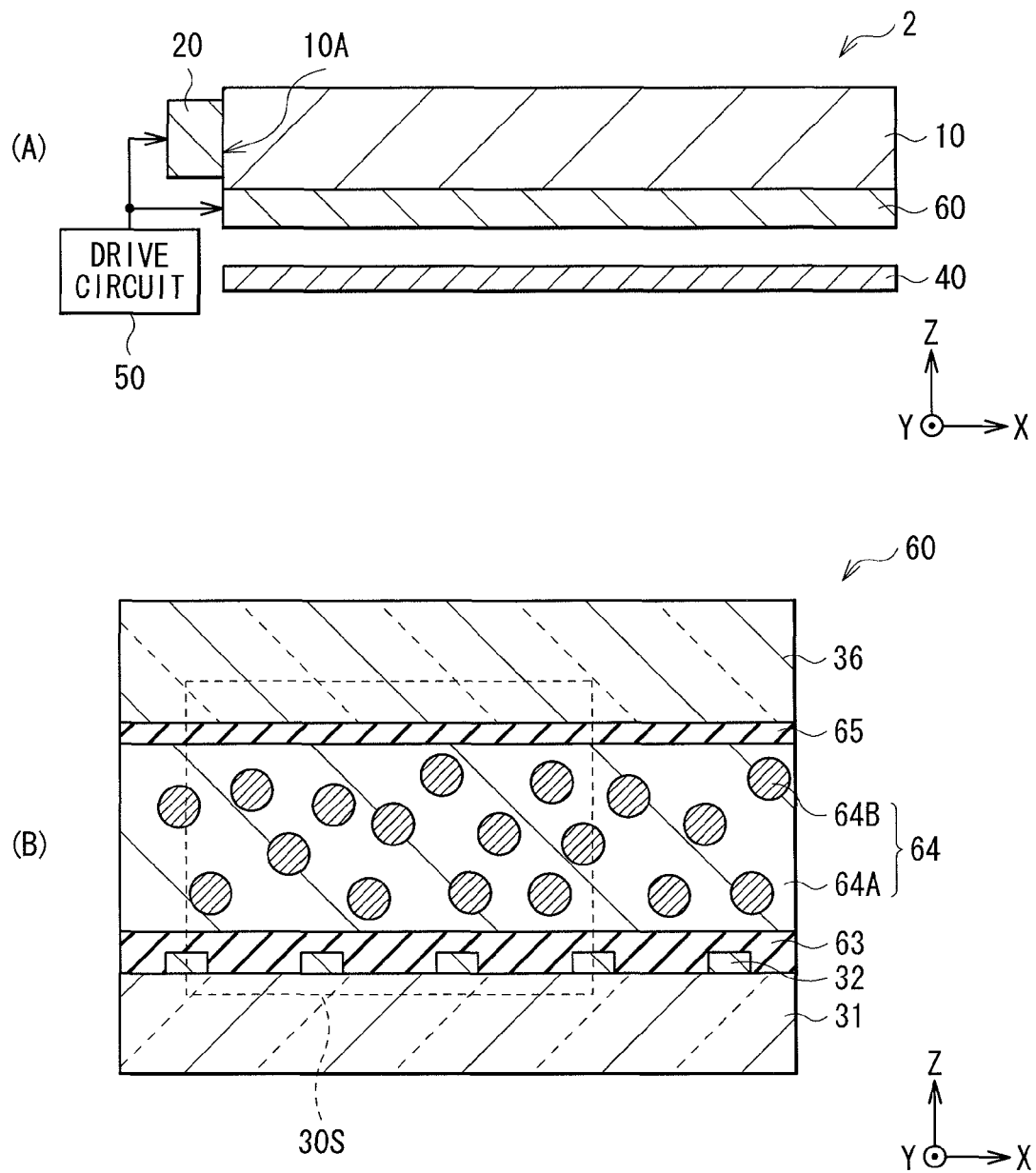
FIG. 12 is a sectional view illustrating an example of a configuration of a backlight according to a second embodiment of the invention.
Figure 15:
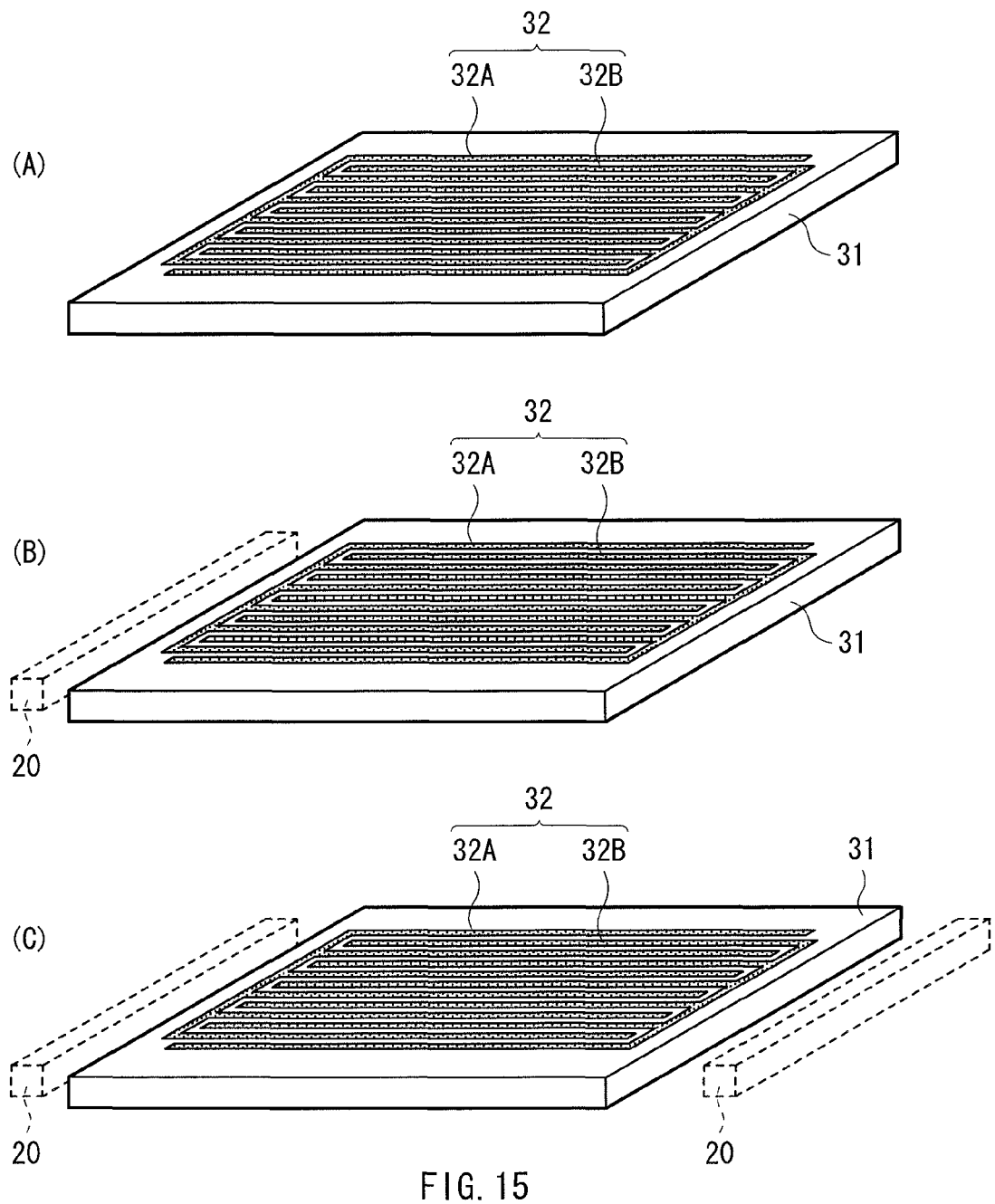
FIG. 15 is a perspective view illustrating another example of the configuration of the electrode in FIG. 1.
Figure 16:
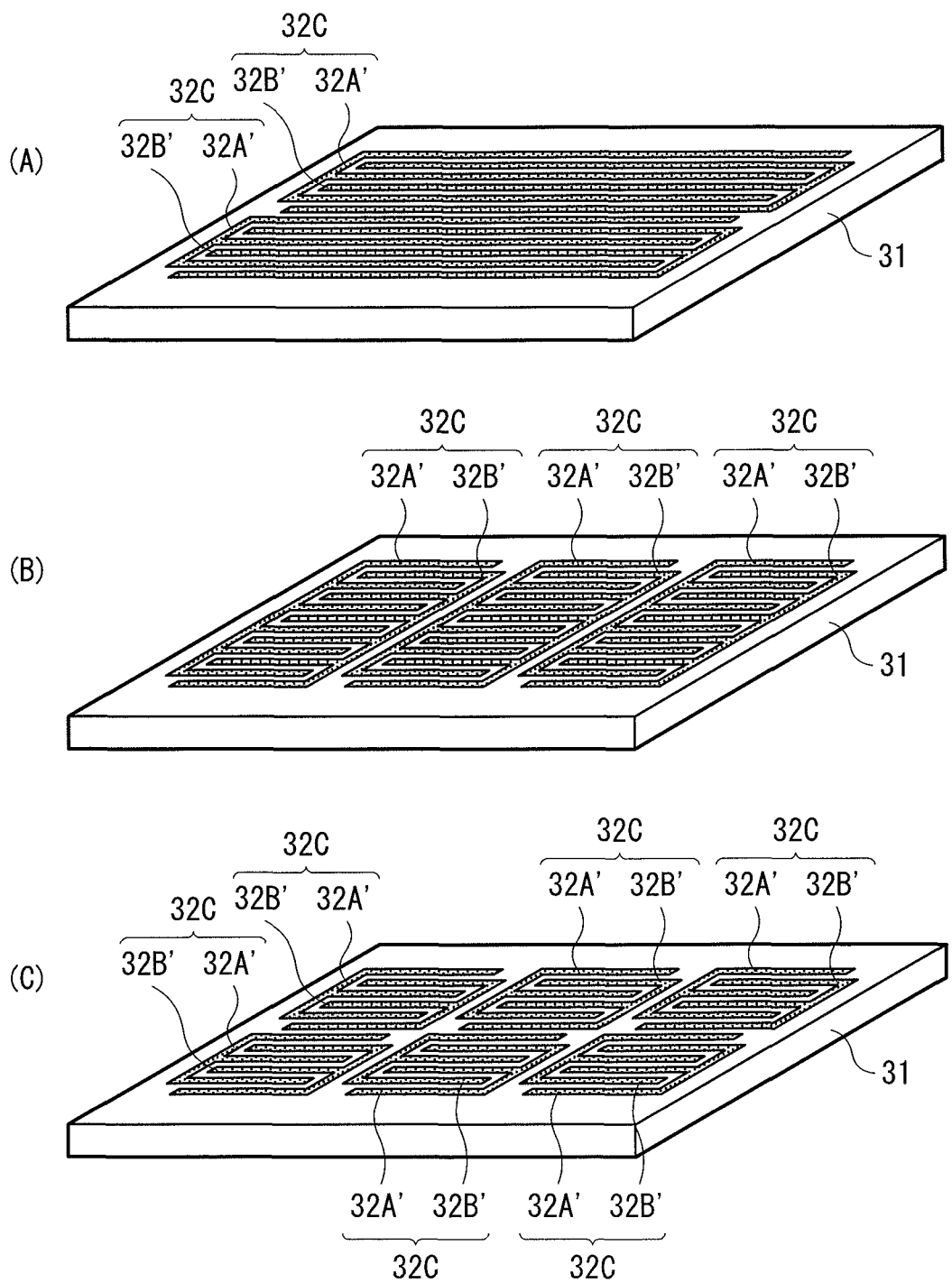
FIG. 16 is a perspective view illustrating another example of the configuration of the electrode in FIG. 15.

1. First Embodiment (FIGS. 1 to 11)
An example in which a light modulation device including a horizontal alignment film is disposed in a backlight
2. Second Embodiment (FIGS. 12 to 14)
An example in which a light modulation device including a vertical alignment film is disposed in a backlight.
3. Modifications
An example in which a direction of comb teeth of an electrode is different (FIGS. 15 and 16)
An example in which an alignment state in a light modulation layer is different (FIGS. 17 to 20)
An example in which strip-like projections are formed on a top surface of a light guide plate (FIGS. 21 to 24)
An example in which the position of a light modulation device is different (FIGS. 25 to 27)
4. Application Example (FIG. 28)
An example in which a backlight of any of the above-described embodiments and the like is used as a light source of a display 1. First Embodiment FIG. 1(A) is a sectional view illustrating an example of a schematic configuration of a backlight 1 (an illumination unit) according to a first embodiment of the invention. FIG. 1(B) is a sectional view illustrating an example of a specific configuration of the backlight 1 in FIG. 1(A). It is to be noted that FIGS. 1(A) and (B) are schematic illustrations, and dimensions and shapes in the illustrations are not necessarily the same as actual dimensions and shapes. The backlight 1 illuminates, for example, a liquid crystal display panel or the like from a back side thereof, and includes a light guide plate 10, a light source 20 disposed on a side surface of the light guide plate 10, a light modulation device 30 and a reflective plate 40 disposed behind the light guide plate 10, and a drive circuit 50 driving the light source 20 and the light modulation device 30.

The light guide plate 10 guides light from the light source 20 disposed on the side surface of the light guide plate 10 to a top surface of the light guide plate 10. The light guide plate 10 has a shape corresponding to a display panel (not illustrated) disposed on the top surface of the light guide plate 10, for example, a rectangular parallelepiped shape surrounded by a top surface, a bottom surface, and side surfaces. It is to be noted that a side surface where light from the light source 20 enters of the side surfaces of the light guide plate 10 is hereinafter referred to as light incident surface 10A. In the light guide plate 10, one or both of the top surface and the bottom surface have a predetermined patterned shape, and the light guide plate 10 has a function of scattering and uniformizing light incident from the light incident surface 10A. It is to be noted that, in the case where a voltage applied to the backlight 1 is modulated to uniformize luminance, a flat light guide plate which is not patterned may be used as the light guide plate 10. The light guide plate 10 also functions as a supporting body supporting an optical sheet (for example, a diffuser plate, a diffuser sheet, a lens film, or a polarization splitter sheet) disposed between the display panel and the backlight 1. The light guide plate 10 is formed by mainly including a transparent thermoplastic resin such as a polycarbonate resin (PC) or an acrylic resin (polymethylmethacrylate (PMMA)).

As illustrated in FIG. 2(A), the light source 20 is configured of a linear light source 21 and a reflective mirror 22. The linear light source 21 is configured of, for example, a hot cathode fluorescent lamp (HCFL) or a CCFL. The reflective mirror 22 reflects, to the light incident surface 10A, light toward a direction not directly entering the light incident surface 10A in light emitted from the linear light source 21. For example, as illustrated in FIG. 2(B) or 2(C), the light source 20 may be configured of a plurality of point-like light sources 23 arranged in one line. The point-like light sources 23 each emit light to the light incident surface 10A, and each are configured of, for example, a light-emitting device having a light emission spot on a surface facing the light incident surface 10A. Examples of such a light-emitting device include an LED and a laser diode (LD).

For example, as illustrated in FIG. 2(B) or 2(C), every two or more point-like light sources 23 in the plurality of point-like light sources 23 may be arranged on one common substrate 24. In this case, a light source block 25 is configured of one substrate 24 and two or more point-like light sources 23 arranged on the substrate 24. The substrate 24 is, for example, a circuit board on which wiring electrically connecting the point-like light sources 23 and the drive circuit 50 to each other is installed, and the respective point-like light sources 23 are mounted on the circuit board. The respective point-like light sources 23 arranged on the common substrate 24 (the respective point-like light sources 23 in one light source block 25) are collectively (not independently) driven by the drive circuit 50, and are connected to one another in parallel or in series (not illustrated). Moreover, the point-like light sources 23 arranged on different substrates 24 (the point-like light sources 23 in respective light source blocks 25) may be collectively (not independently) driven by the drive circuit 50, and are connected to one another, for example, in parallel as illustrated in FIG. 2(B), or in series (not illustrated). For example, the point-like light sources 23 arranged on different substrates 24 (the point-like light sources 23 in respective light source blocks 25) may be driven by the drive circuit 50 independently of one light source block 25 to another. At this time, for example, as illustrated in FIG. 2(C), the point-like light sources 23 arranged on different substrates 24 (the point-like light sources 23 in respective light source blocks 25) are connected to different current paths.

As illustrated in FIGS. 2(A) to 2(C), the light source 20 may be disposed on only one side surface of the light guide plate 10, or although not illustrated, the light sources 20 may be disposed on two side surfaces, three side surfaces, or all side surfaces of the light guide plate 10.

The reflective plate 40 returns light leaked from behind the light guide plate 10 through the light modulation device 30 to the light guide plate 10, and has, for example, functions such as reflection, diffusion, and scattering. The reflective plate 40 allows light emitted from the light source 20 to be efficiently used, and is also useful to improve front luminance. The reflective plate 40 is made of, for example, foamed PET (polyethylene terephthalate), a silver-evaporated film, a multilayer reflective film, or white PET.

In the embodiment, the light modulation device 30 is in close contact with a back side (the bottom surface) of the light guide plate 10 without an air layer in between, and is bonded to the back side of the light guide plate 10 with, for example, an adhesive (not illustrated) in between. For example, as illustrated in FIG. 1(B), the light modulation device 30 is configured by arranging a transparent substrate 31, an electrode 32, an alignment film 33, a light modulation layer 34, an alignment film 35, and a transparent substrate 36 in order from a side closer to the reflective plate 40.

The transparent substrates 31 and 36 support the light modulation layer 34, and are typically configured of substrates transparent to visible light, for example, glass plates or plastic films. The electrode 32 is disposed on a surface located closer to the light modulation layer 34 of the transparent substrate 31, and has a configuration allowing an electric field to be generated in the light modulation layer 34 in a direction parallel to a surface of the transparent substrate 31. More specifically, for example, as illustrated in a part of the light modulation device 30 in FIG. 3(A), the electrode 32 includes a first electrode 32A having comb teeth which extend in one direction (a first direction) in a plane and a second electrode 32B having comb teeth which are arranged alternately with the comb teeth of the first electrode 32A. For example, as illustrated in FIGS. 3(B) and (C), the comb teeth of the first electrode 32A and the second electrode 32B extend in a direction parallel to an extending direction of the light source 20 when the light source 20 is disposed close to only one side surface of the light modulation device 30 or when the light sources 20 are arranged close to two side surfaces facing each other of the side surfaces of the light modulation device 30.

For example, as illustrated in FIGS. 3(A) to (C), the first electrode 32A and the second electrode 32B each may be configured of a single structure formed on an entire surface of the transparent substrate 31. Moreover, for example, as illustrated in FIGS. 4(A) to (C), the first electrode 32A and the second electrode 32B each may be configured of a plurality of structures (sub-electrodes 32A' and 32B'). Each of the sub-electrodes 32A' has comb teeth extending in one direction (the first direction) in a plane, and each of the sub-electrodes 32B' has comb teeth arranged alternately with the comb teeth of the sub-electrode 32A'. It is to be noted that a pair of the sub-electrodes 32A' and 32B' engaged in each other is referred to as sub-electrode pair 32C.

A plurality of sub-electrode pairs 32C may be arranged in one direction in a plane, for example, as illustrated in FIGS. 4(A) and (B), or in a matrix, for example, as illustrated in FIG. 4(C). It is to be noted that an arrangement direction in FIG. 4(A) corresponds to a direction parallel to an extending direction of the light source 20 when the light source 20 is disposed on only one side surface of the light guide plate 10, or when the light sources 20 are arranged on two side surfaces facing each other of the side surfaces of the light guide plate 10. Moreover, an arrangement direction in FIG. 4(B) corresponds to a direction orthogonal to the extending direction of the light source 20 when the light source 20 is disposed on only one side surface of the light guide plate 10, or when the light sources 20 are arranged on two side surfaces facing each other of the side surfaces of the light guide plate 10. Further, an arrangement direction in FIG. 4(C) corresponds to two directions including a direction parallel to the extending direction of the light source 20 and the direction orthogonal to the extending direction of the light source 20 when the light source 20 is disposed on only one side surface of the light guide plate 10, or when the light sources 20 are arranged on two side surfaces facing each other of the side surfaces of the light guide plate 10.

Figure 5:
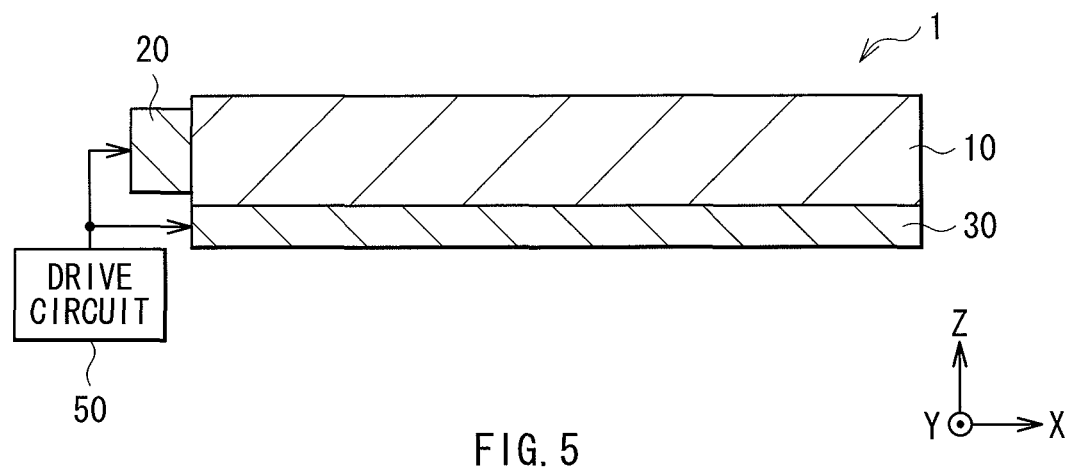
FIG. 5 is a sectional view illustrating another example of the configuration of the backlight in FIG. 1.

The electrode 32 is made of a transparent conductive material, for example, indium tin oxide (ITO). However, the electrode 32 may not be made of a transparent material, and may be made of, for example, metal. It is to be noted that when the electrode 32 is made of metal, the electrode 32 also has a function of reflecting light entering the light modulation device 30 from behind the light guide plate 10 as in the case of the reflective plate 40. Therefore, in this case, for example, as illustrated in FIG. 5, the reflective plate 40 may not be included.

In the case where the first electrode 32A and the second electrode 32B are configured of a plurality of sub-electrodes 32A' and 32B', respectively, portions facing the sub-electrode pairs 32C of the light modulation device 30 when the sub-electrode pairs 32C are viewed from a direction of a normal to the light modulation device 30 configure light modulation cells 30S. For example, a portion indicated by a broken line in FIG. 1(B) configures the light modulation cell 30S. The light modulation cells 30S are allowed to be separately and independently driven by applying a predetermined voltage to the sub-electrodes 32A' and 32B', and exhibit transparency or a scattering property with respect to light from the light source 20, depending on a voltage value applied to the sub-electrodes 32A' and 32B'. It is to be noted that transparency and the scattering property will be described in more detail when the light modulation layer 34 is described.

The alignment films 33 and 35 align, for example, a liquid crystal or a monomer used in the light modulation layer 34. Kinds of alignment films include a vertical alignment film and a horizontal alignment film, and in the embodiment, horizontal alignment films are used as the alignment films 33 and 35. Examples of the horizontal alignment films include an alignment film formed by performing a rubbing process on polyimide, polyamide imide, polyvinyl alcohol, or the like, and an alignment film provided with a groove by transfer or etching. Other examples of the horizontal alignment films include an alignment film formed by obliquely evaporating an inorganic material such as silicon oxide, a diamond-like carbon alignment film formed by ion beam irradiation, and an alignment film provided with an electrode pattern slit. In the case where plastic films are used as the transparent substrates 31 and 36, in a manufacturing process, polyamide imide capable of forming a film at a temperature of 100° C. or less is preferably used for the alignment films 33 and 35, because a firing temperature after coating surfaces of the transparent substrates 31 and 36 with the alignment films 33 and 35 is preferably as low as possible.

Moreover, it is only necessary for both of vertical and horizontal alignment films to have a function of aligning a liquid crystal and a monomer, and reliability, which is necessary for a typical liquid crystal display, with respect to repeated voltage application is not necessary. It is because reliability with respect to voltage application after forming a device is determined by an interface between a resultant formed by polymerizing a monomer, and a liquid crystal. Moreover, even if the alignment films 33 and 35 are not used, for example, when an electric field or a magnetic field is applied between the first electrode 32A and the second electrode 32B (or the sub-electrodes 32A' and 32B'), a liquid crystal or a monomer used in the light modulation layer 34 is allowed to be aligned. In other words, while an electric field or a magnetic field is applied between the first electrode 32A and the second electrode 32B (or the sub-electrodes 32A' and 32B'), the alignment state of the liquid crystal or the monomer under voltage application is allowed to be fixed by ultraviolet irradiation. In the case where a voltage is used to form the alignment films 33 and 35, an electrode for alignment and an electrode for drive may be separately formed, or as a liquid crystal material, a dual-frequency liquid crystal allowing the sign of dielectric constant anisotropy to be inverted by a frequency may be used. Moreover, in the case where a magnetic field is used to form the alignment films 33 and 35, for the alignment films 33 and 35, a material with large magnetic susceptibility anisotropy is preferably used, and, for example, a material with a large number of benzene rings is preferably used.

The light modulation layer 34 exhibits a scattering property or transparency with respect to light from the light source 20 depending on magnitude of an electric field. More specifically, the light modulation layer 34 exhibits transparency with respect to light from the light source 20 when a voltage is not applied to the electrode 32 and exhibits the scattering property when a voltage is applied to the electrode 32. For example, as illustrated in FIG. 1(B), the light modulation layer 34 is a composite layer including a bulk 34A and a plurality of microparticles 34B dispersed in the bulk 34A. The bulk 34A and the microparticles 34B have optical anisotropy.

Figure 6:
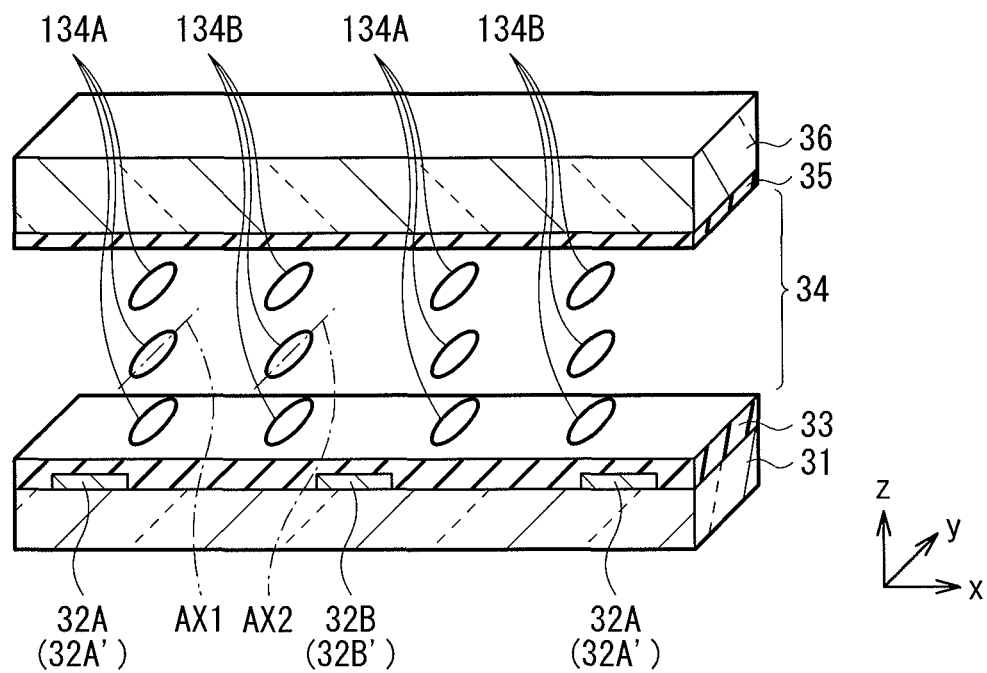
FIG. 6 is a schematic view for describing a configuration when a voltage is not applied to a light modulation device in FIG. 1.

FIG. 6 schematically illustrates an example of an alignment state in the bulk 34A and the microparticles 34B when a voltage is not applied between the first electrode 32A and the second electrode 32B (or the sub-electrodes 32A' and 32B'). An ellipsoid 134A in FIG. 6 is an example of a refractive index ellipsoid exhibiting refractive index anisotropy of the bulk 34A when a voltage is not applied between the first electrode 32A and the second electrode 32B (or the sub-electrodes 32A' and 32B'). An ellipsoid 134B in FIG. 6 is an example of a refractive index ellipsoid exhibiting refractive index anisotropy of the microparticle 34B when a voltage is not applied between the first electrode 32A and the second electrode 32B (or the sub-electrodes 32A' and 32B'). The refractive index ellipsoid is a tensor ellipsoid representing a refractive index of linearly polarized light incident from various directions, and when a section of an ellipsoid from a light incident direction is observed, the refractive index is allowed to be geometrically learned.

Figure 7:
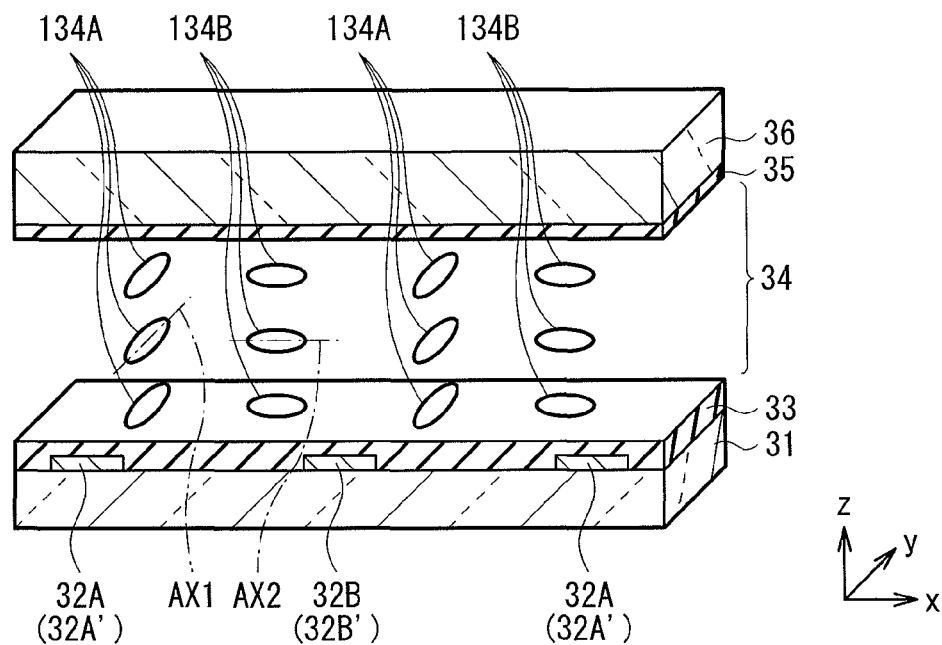
FIG. 7 is a schematic view for describing a configuration when a voltage is applied to the light modulation device in FIG. 1.
Figure 8:
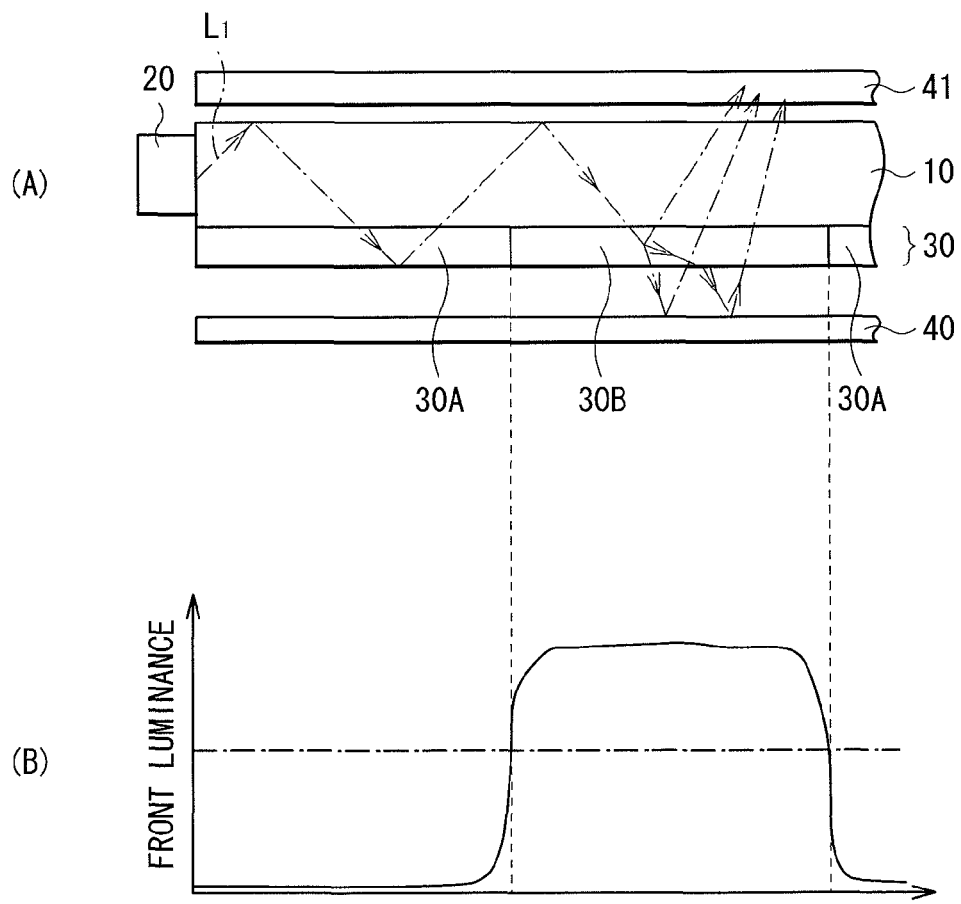
FIG. 8 is a schematic view for describing a function of the backlight in FIG. 1.
Figure 9:
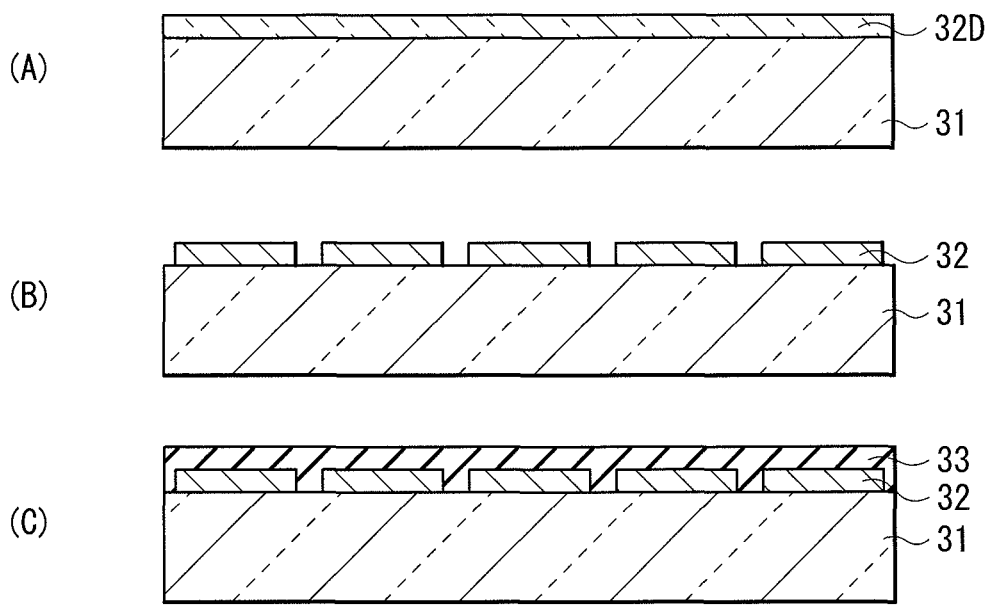
FIG. 9 is a sectional view for describing a step of manufacturing the backlight in FIG. 1.
Figure 10:
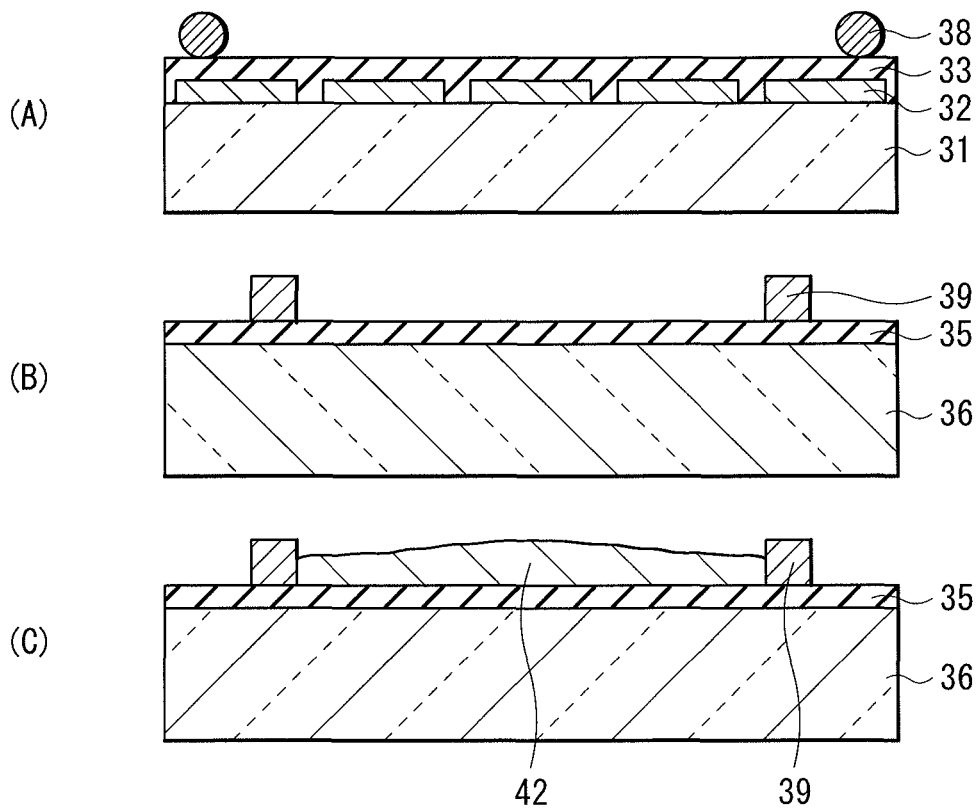
FIG. 10 is a sectional view for describing a manufacturing step following FIG. 9.
Figure 11:
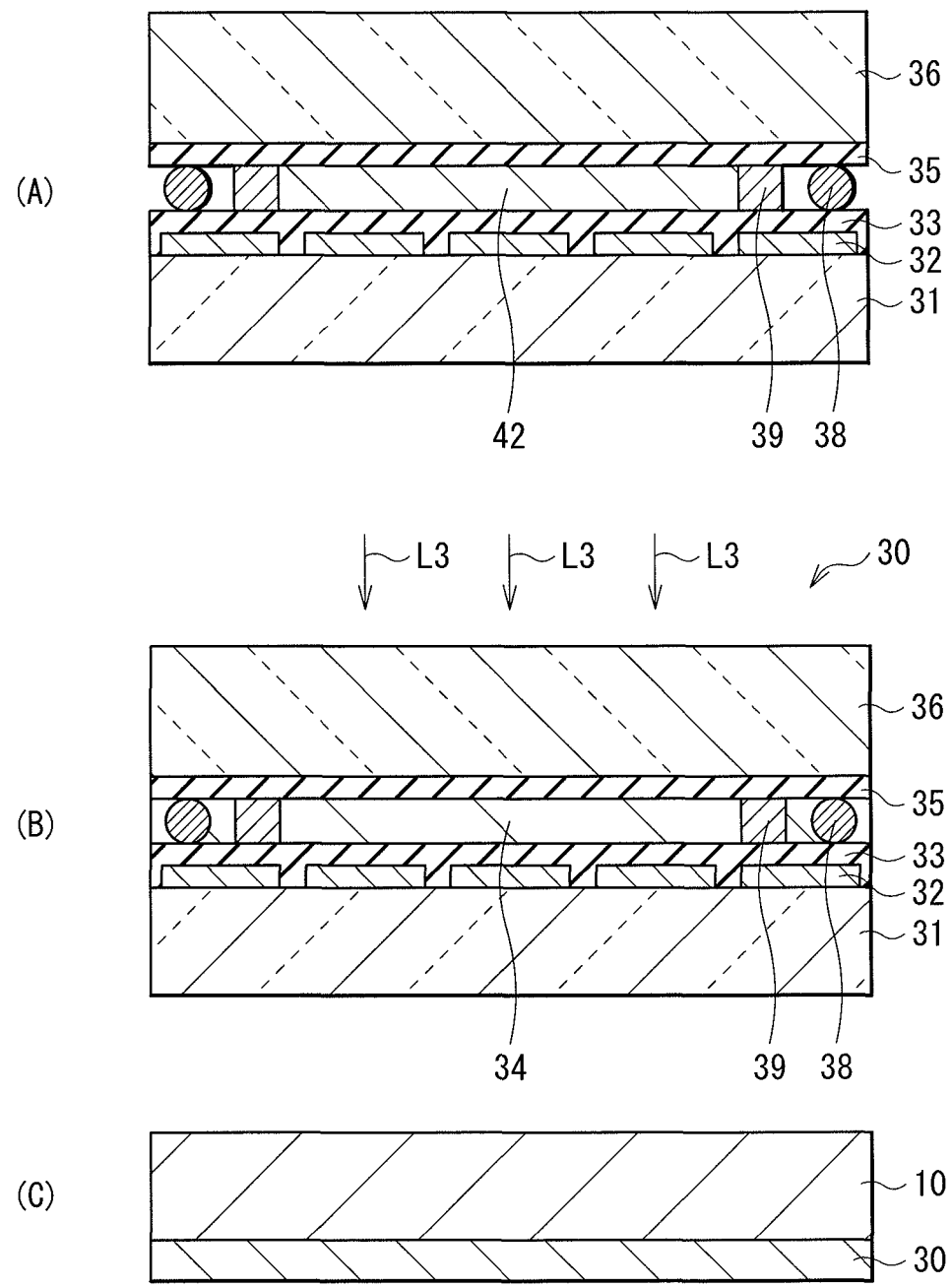
FIG. 11 is a sectional view for describing a manufacturing step following FIG. 10.

FIG. 7 schematically illustrates an example of an alignment state in the bulk 34A and the microparticles 34B when a voltage is applied between the first electrode 32A and the second electrode 32B (or the sub-electrodes 32A' and 32B'). An ellipsoid 134A in FIG. 7 is an example of a refractive index ellipsoid exhibiting refractive index anisotropy of the bulk 34A when a voltage is applied between the first electrode 32A and the second electrode 32B (or the sub-electrodes 32A' and 32B'). An ellipsoid 134B in FIG. 7 is an example of a refractive index ellipsoid exhibiting refractive index anisotropy of the microparticle 34B when a voltage is applied between the first electrode 32A and the second electrode 32B (or the sub-electrodes 32A' and 32B').

For example, as illustrated in FIG. 6, the bulk 34A and the microparticle 34B are structured to allow the direction of an optical axis AX1 of the bulk 34A (a long axis of the ellipsoid 134A) and the direction of an optical axis AX2 of the microparticle 34B (a long axis of the ellipsoid 134B) to coincide with (be parallel to) each other when a voltage is not applied between the first electrode 32A and the second electrode 32B (or the sub-electrodes 32A' and 32B'). It is to be noted that the optical axes AX1 and AX2 each indicate a line parallel to a travel direction of a light beam allowing a refractive index to have one value irrespective of polarization direction. Moreover, it is not necessary for the directions of the optical axis AX1 and the optical axis AX2 to consistently coincide with each other when a voltage is not applied between the first electrode 32A and the second electrode 32B (or the sub-electrodes 32A' and 32B'), and the directions of the optical axis AX1 and the optical axis AX2 may be slightly deviated from each other due to, for example, a manufacturing error.

Moreover, the optical axis AX2 is parallel to the light incident surface 10A of the light guide plate 10 as well as parallel to a surface of the transparent substrate 31 when a voltage is not applied between the first electrode 32A and the second electrode 32B (or the sub-electrodes 32A' and 32B'). In other words, when a voltage is not applied between the first electrode 32A and the second electrode 32B (or the sub-electrodes 32A' and 32B'), the optical axis AX2 is parallel to a plane including the first electrode 32A and the second electrode 32B (or the sub-electrodes 32A' and 32B') as well as parallel to an extending direction of comb teeth of the first electrode 32A and the second electrode 32B (or the sub-electrodes 32A' and 32B').

On the other hand, the bulk 34A is structured to have a fixed optical axis AX1 irrespective of whether or not a voltage is applied between the first electrode 32A and the second electrode 32B (or the sub-electrodes 32A' and 32B'). More specifically, the optical axis AX1 is parallel to the light incident surface 10A of the light guide plate 10 as well as parallel to the surface of the transparent substrate 31. In other words, when a voltage is not applied between the first electrode 32A and the second electrode 32B (or the sub-electrodes 32A' and 32B'), the optical axis AX1 is parallel to the optical axis AX2.

It is to be noted that it is not necessary for the optical axis AX2 to be consistently parallel to the light incident surface 10A of the light guide plate 10 as well as the surface of the transparent substrate 31, and the optical axis AX2 may be aligned in a direction intersecting with one or both of the light incident surface 10A and the surface of the transparent substrate 31 at a small angle due to, for example, a manufacturing error.

In this case, ordinary refractive indices of the bulk 34A and the microparticle 34B are preferably equal to each other, and extraordinary refractive indices of the bulk 34A and the microparticle 34B are preferably equal to each other. In this case, for example, when a voltage is not applied between the first electrode 32A and the second electrode 32B (or the sub-electrodes 32A' and 32B'), there is little difference in refractive index in all directions including a front direction and an oblique direction, and high transparency is obtained. Therefore, light toward the front direction and light toward the oblique direction pass through the light modulation layer 34 without being scattered in the light modulation layer 34. As a result, for example, as illustrated in FIGS. 8(A) and (B), light L from the light source 20 (light from the oblique direction) is totally reflected by an interface (an interface between the transparent substrate 31 or the light guide plate 10 and air) of a transparent region (a transmission region 30A) of the light modulation device 30, and luminance (luminance in black display) in the transmission region 30A is decreased, compared to the case where the light modulation device 30 is not included (indicated by an alternate long and short dash line in FIG. 8(B)). It is to be noted that a graph in FIG. 8(B) is obtained by measuring front luminance in a state where a diffuser sheet 41 is disposed on the light guide plate 10 as illustrated in FIG. 8(A).

Moreover, for example, as illustrated in FIG. 7, the bulk 34A and the microparticles 34B are structured to allow directions of the optical axes AX1 and AX2 to be different from (intersect with or be orthogonal to) each other when a voltage is applied between the first electrode 32A and the second electrode 32B (or the sub-electrodes 32A' and 32B'). Further, for example, the microparticles 34B are structured to allow the optical axis AX2 to be parallel to the normal to the light incident surface 10A of the light guide plate 10 as well as parallel to the surface of the transparent substrate 31 when a voltage is applied between the first electrode 32A and the second electrode 32B (or the sub-electrodes 32A' and 32B'). In other words, when a voltage is applied between the first electrode 32A and the second electrode 32B (or the sub-electrodes 32A' and 32B'), the optical axis AX2 is parallel to a plane including the first electrode 32A and the second electrode 32B (or the sub-electrodes 32A' and 32B') and intersects with (or is orthogonal to) an extending direction of comb teeth of the sub-electrodes 32A' and 32B'.

Therefore, when a voltage is applied between the first electrode 32A and the second electrode 32B (or the sub-electrodes 32A' and 32B'), in the light modulation layer 34, a difference in refractive index in all directions in a plane parallel to the surface of the transparent substrate 31 is increased to obtain a high scattering property. Accordingly, for example, light toward the front direction and light toward the oblique direction are scattered in the light modulation layer 34. As a result, for example, as illustrated in FIGS. 8(A) and (B), the light L from the light source 20 (light from the oblique direction) passes through an interface (an interface between the transparent substrate 31 or the light guide plate 10 and the air) of a region in a scattering state (a scattering region 30B) in the light modulation device 30, and light having passed toward the reflective plate 40 is reflected by the reflective plate 40 to pass through the light modulation device 30. Therefore, the luminance of the scattering region 30B is extremely higher than that in the case where the light modulation device 30 is not included (indicated by an alternate long and short dash line in FIG. 8(B)), and luminance in white display is partially increased (partial luminance enhancement) by a reduced amount of the luminance of the transmission region 30A.

It is to be noted that the ordinary refractive indices of the bulk 34A and the microparticle 34B may be slightly different from each other due to, for example, a manufacturing error, and are preferably, for example, 0.1 or less, and more preferably 0.05 or less. Moreover, the extraordinary refractive indices of the bulk 34A and the microparticle 34B may be slightly different from each other due to, for example, a manufacturing error, and are preferably, for example, 0.1 or less, and more preferably 0.05 or less.

Moreover, a refractive index difference (=extraordinary refractive index−ordinary refractive index) in the bulk 34A and a refractive index difference (=extraordinary refractive index−ordinary refractive index) in the microparticle 34B are preferably as large as possible, and are preferably 0.05 or over, more preferably 0.1 or over, and still more preferably 0.15 or over. In the case where the refractive index differences in the bulk 34A and the microparticle 34B are large, the scattering power of the light modulation layer 34 is enhanced to allow light guide conditions to be easily disrupted, thereby allowing light from the light guide plate 10 to be easily extracted.

Further, the bulk 34A and the microparticle 34B have different response speeds with respect to an electric field. The bulk 34A has, for example, a streaky structure or a porous structure which does not respond to an electric field, or a rod-like structure having a response speed slower than that of the microparticle 34B. The bulk 34A is formed of, for example, a polymer material obtained by polymerizing a low-molecular monomer. The bulk 34A is formed, for example, by polymerizing, by one or both of heat and light, a material (for example, a monomer) with orientation and polymerization which is aligned along the alignment direction of the microparticles 34B or the alignment directions of the alignment films 33 and 35.

On the other hand, the microparticles 34B mainly include, for example, a liquid crystal material, and have a response speed sufficiently higher than that of the bulk 34A. Examples of the liquid crystal material (liquid crystal molecules) included in the microparticles 34B include rod-like molecules. As liquid crystal molecules included in the microparticles 34B, liquid crystal molecules having positive dielectric constant anisotropy (a so-called positive type liquid crystal) are preferably used.

In this case, when a voltage is not applied between the first electrode 32A and the second electrode 32B (or the sub-electrodes 32A' and 32B'), the long-axis directions of the liquid crystal molecules in the microparticles 34B are parallel to the optical axis AX1. At this time, the long axes of the liquid crystal molecules in the microparticles 34B are parallel to the light incident surface 10A of the light guide plate 10 as well as parallel to the surface of the transparent substrate 31. Moreover, when a voltage is applied between the first electrode 32A and the second electrode 32B (or the sub-electrodes 32A' and 32B'), the long-axis directions of the liquid crystal molecules in the microparticles 34B intersect with (or is orthogonal to) the optical axis AX1. At this time, the long axes of the liquid crystal molecules in the microparticles 34B are parallel to the normal to the light incident surface 10A of the light guide plate 10 as well as parallel to the surface of the transparent substrate 31.

The above-described monomer having orientation and polymerization may be a material having optical anisotropy and forming a composite material with a liquid crystal; however, a low-molecular monomer which is cured with ultraviolet light is preferable in this embodiment. It is preferable that, in a state where no voltage is applied, directions of optical anisotropy of the liquid crystal and a resultant (a polymer material) formed by polymerizing a low-molecular monomer coincide with each other; therefore, before curing the low-molecular monomer with ultraviolet light, the liquid crystal and the low-molecular monomer are preferably aligned in the same direction. In the case where a liquid crystal is used as the microparticles 34B, when the liquid crystal includes rod-like molecules, the used monomer material preferably has a rod-like shape. As described above, a material having both of polymerization and liquid crystal properties is preferably used as the monomer material, and, for example, the monomer material preferably includes one or more functional groups selected from the group consisting of an acrylate group, a methacrylate group, an acryloyloxy group, a methacryloyloxy group, a vinyl ether group, and an epoxy group as polymerizable functional groups. These functional groups are allowed to be polymerized by ultraviolet, infrared, or electron irradiation, or by heating. To suppress a reduction in the degree of alignment under ultraviolet irradiation, a liquid crystal material having a polyfuncitonal group may be added. In the case where the bulk 34A has the above-described streaky structure, as the material of the bulk 34A, a bifunctional liquid crystal monomer is preferably used. Moreover, a monofunctional monomer may be added to the material of the bulk 34A to adjust a temperature at which liquid crystal properties are exhibited, or a tri- or more-functional monomer may be added to the material of the bulk 34A to improve crosslink density.

For example, the drive circuit 50 controls the magnitude of a voltage applied to the first electrode 32A and the second electrode 32B (or the sub-electrodes 32A' and 32B') to allow the optical axes AX2 of the microparticles 34B in one light modulation cell 30S to be parallel or substantially parallel to the optical axis AX1 of the bulk 34A, as well as to allow the optical axes AX2 of the microparticles 34B in another light modulation cell 30S to intersect with or be orthogonal to the optical axis AX1 of the bulk 34A. In other words, the drive circuit 50 allows, by electric field control, the direction of the optical axis AX1 of the bulk 34A and the directions of the optical axes AX2 of the microparticles 34B to coincide with (or substantially coincide with) each other or to be different from (or orthogonal to) each other.

Moreover, for example, when the electrode 32 is configured of a plurality of sub-electrode pairs 32C and the sub-electrode pairs 32C are arranged in a direction parallel to the normal to the light incident surface 10A, the drive circuit 50 applies, to the sub-electrode pairs 32C, a voltage with a peak value, a duty ratio, and a frequency one or more of which are modulated according to a distance from the light source 20 to the sub-electrode pairs 32C. For example, the voltage is modulated to enhance the scattering property of the light modulation cell 30S with increasing distance from the light source 20. Further, the drive circuit 50 may apply, to the sub-electrode pairs 32C, a voltage with the peak value, the duty ratio, and the frequency one or more of which are modulated with consideration given to not only the distance from the light source 20 but also an externally supplied image signal.

Moreover, for example, when the light source 20 is configured of a plurality of light source blocks 25 capable of being driven independently of each other, the drive circuit 50 may apply, to respective light source blocks 25, a voltage or a current with a peak value, a duty ratio, and a frequency one of which is modulated according to a distance from the light source 20 to a sub-electrode pair 32C to which a voltage is to be applied and an externally supplied image signal.

Next, a method of manufacturing the backlight 1 according to the embodiment will be described below referring to FIGS. 9(A) to (C) to FIGS. 11(A) to (C).

First, a transparent conductive film 32D made of ITO or the like is formed on the transparent substrate 31 configured of a glass substrate or a plastic film substrate (refer to FIG. 9(A)). Next, a patterned resist layer (not illustrated) is formed on the transparent conductive film 32D, and then the transparent conductive film 32D is selectively etched with use of the resist layer as a mask. As a result, the electrode 32 is formed (refer to FIG. 9(B)).

Next, after an entire surface of the transparent substrate 31 is coated with the alignment film 33, the alignment film 33 is dried and fired (refer to FIG. 9(C)). In the case where a polyimide-based material is used as the alignment film 33, NMP (N-methyl-2-pyrrolidone) is often used as a solvent; however, at this time, a temperature of approximately 200° C. is necessary under an atmosphere. It is to be noted that, in this case, when a plastic substrate is used as the transparent substrate 31, the alignment film 33 may be vacuum-dried and fired at 100° C. After that, a rubbing process is performed on the alignment film 33. Therefore, the alignment film 33 functions as an alignment film for horizontal alignment.

Next, spacers 38 allowing a cell gap to be formed are sprayed on the alignment film 33 by a dry method or a wet method (refer to FIG. 10(A)). It is to be noted that, in the case where the light modulation cells 30S are formed by a vacuum bonding method, the spacers 38 may be mixed in a mixture which is to be dropped. Alternatively, columnar spacers may be formed by a photolithography method, instead of the spacers 38.

Then, the alignment film 35 formed by a method similar to the above-described method is coated with a sealant pattern 39 for bonding and preventing leakage of the liquid crystal in, for example, a frame shape (refer to FIG. 10(B)). The sealant pattern 39 is allowed to be formed by a dispenser method or a screen printing method.

The vacuum bonding method (a one-drop-fill (ODF) method) will be described below; however, the light modulation cells 30S may also be formed by a vacuum injection method, a roll bonding method, or the like.

First, a mixture 42 of a liquid crystal and a monomer, corresponding to a volume determined by a cell gap, a cell area, or the like, is dropped uniformly on a plane (refer to FIG. 10(C)). The mixture 42 is preferably dropped with use of a linear guide precise dispenser; however, a die coater or the like may be used with use of the sealant pattern 39 as a bank.

The above-described materials may be used as the liquid crystal and the monomer, and a weight ratio of the liquid crystal to the monomer is within a range of 98:2 to 50:50, preferably within a range of 95:5 to 75:25, and more preferably within a range of 92:8 to 85:15. A drive voltage is allowed to be decreased by increasing the ratio of the liquid crystal; however, when the liquid crystal is increased too much, the liquid crystal tends to have difficulty in returning to a transparent state, such as a reduction in whiteness under voltage application or a decrease in the response speed after turning the voltage off.

In addition to the liquid crystal and the monomer, a polymerization initiator is added to the mixture 42. A monomer ratio of the added polymerization initiator is adjusted within a range of 0.1 to 10 wt %, depending on a used ultraviolet wavelength. A polymerization inhibitor, a plasticizer, a viscosity modifier, or the like may be further added to the mixture 42, as necessary. When the monomer is a solid or gel at room temperature, a cap, a syringe, and a substrate are preferably warmed.

After the transparent substrates 31 and 36 are put in a vacuum bonding system (not illustrated), evacuation is performed to bond the transparent substrates 31 and 36 (refer to FIG. 11(A)). After that, a resultant is released to the atmosphere to uniformize the cell gap by uniform pressurization under atmospheric pressure. The cell gap may be appropriately selected based on a relationship between white luminance (whiteness) and the drive voltage; however, the cell gap is within a range of 5 to 40 μm, preferably within a range of 6 to 20 μm, and more preferably within a range of 7 to 10 μm.

After bonding, an alignment process is preferably performed as necessary (not illustrated). In the case where light leakage occurs by an insertion of a bonded cell between crossed-Nicols polarizers, the cell may be heated for a predetermined time or be left at room temperature to be aligned. After that, the monomer is irradiated with ultraviolet light L3 to be polymerized (refer to FIG. 11(B)). Thus, the light modulation device 30 is manufactured.

It is preferable to prevent the temperature of the cell from being changed under ultraviolet irradiation. An infrared cut filter is preferably used, or an UV-LED or the like is preferably used as a light source. Ultraviolet irradiance exerts an influence on an organization structure of a composite material; therefore, the ultraviolet irradiance is preferably adjusted appropriately based on a used liquid crystal material or a used monomer material, and a composition thereof, and the ultraviolet irradiance is preferably within a range of 0.1 to 500 mW/cm$^2$, and more preferably within a range of 0.5 to 30 mW/cm$^2$. There is a tendency that the lower the ultraviolet irradiance is, the lower the drive voltage becomes, and preferable ultraviolet irradiance is allowed to be selected in terms of both of productivity and properties.

Then, the light modulation device 30 is bonded to the light guide plate 10 (refer to FIG. 11(C)). Bonding may be carried out by sticking or adhesion; however, it is preferable that the light modulation device 30 be adhered or stuck with a material having a refractive index which is as close to a refractive index of the light guide plate 10 and a refractive index of a substrate material of the light modulation device 30 as possible. Finally, leading lines (not illustrated) are attached to the electrode 32. Thus, the backlight 1 according to the embodiment is manufactured.

Although the process of forming the light modulation device 30, and finally bonding the light modulation device 30 to the light guide plate 10 is described, the transparent substrate 36 on which the alignment film 35 is formed may be bonded in advance to the surface of the light guide plate 10 to form the backlight 1. Moreover, the backlight 1 may be formed by one of a sheet-feeding method and a roll-to-roll method.

Next, functions and effects of the backlight 1 according to the embodiment will be described below.

In the backlight 1 according to the embodiment, a voltage is applied between the sub-electrodes 32A' and 3B' of respective light modulation cells 30S to allow the optical axes AX2 of the microparticles 34B in one light modulation cell 30S to be parallel or substantially parallel to the optical axis AX1 of the bulk 34A, and to allow the optical axes AX2 of the microparticles 34B in another light modulation cell 30S to intersect with or be orthogonal to the optical axis AX1 of the bulk 34A. As a result, light emitted from the light source 20 and entering into the light guide plate 10 passes through the transmission region 30A where the optical axes AX1 and AX2 are parallel or substantially parallel to each other of the light modulation device 30. On the other hand, light emitted from the light source 20 and entering into the light guide plate 10 is scattered in the scattering region 30B where the optical axes AX1 and AX2 intersect with or are orthogonal to each other of the light modulation device 30. Light having passed through a bottom surface of the scattering region 30B in the scattered light is reflected by the reflective plate 40 to be returned to the light guide plate 10 again, and then the light is emitted from a top surface of the backlight 1. Moreover, light toward a top surface of the scattering region 30B in the scattered light passes through the light guide plate 10, and then is emitted from the top surface of the backlight 1. Thus, in the embodiment, light is hardly emitted from the top surface of the transmission region 30A, and light is emitted from the top surface of the scattering region 30B. Accordingly, a modulation ratio in a front direction is increased.

Typically, PDLC is a composite layer which is formed by mixing the liquid crystal material and an isotropic low-molecular material, and causing phase separation by ultraviolet irradiation, drying of a solvent, or the like, and has microparticles of the liquid crystal material dispersed in a polymer material. The liquid crystal material in the composite layer is aligned in random directions under no voltage application, and thus exhibits the scattering property, but on the other hand, under voltage application, the liquid crystal material is aligned in an electric field direction; therefore, in the case where the ordinary refractive index of the liquid crystal material and the refractive index of the polymer material are equal to each other, the liquid crystal material exhibits high transparency in the front direction (in a direction of a normal to the PDLC). However, in this liquid crystal material, a difference between the extraordinary refractive index of the liquid crystal material and the refractive index of the polymer material becomes pronounced in an oblique direction; therefore, even if the liquid crystal material has transparency in the front direction, the liquid crystal material exhibits the scattering property in the oblique direction.

A typical light modulation device using the PDLC often has a configuration in which the PDLC is sandwiched between two glass plates on which transparent conductive films are formed. When light obliquely enters from air into the light modulation device with the above-described configuration, the light incident from the oblique direction is refracted by a refractive index difference between the air and the glass plate to enter into the PDLC at a smaller angle. Therefore, large scattering does not occur in such a light modulation device. For example, when light enters from air at an angle of 80°, the incident angle of the light to the PDLC is reduced to approximately 40° by refraction at a glass interface.

However, in an edge-light system with use of a light guide plate, as light enters through the light guide plate, the light crosses the PDLC at a large angle of approximately 80°. Accordingly, a difference between the extraordinary refractive index of the liquid crystal material and the refractive index of the polymer material is large, and light crosses the PDCL at a larger angle, thereby causing a longer optical path subjected to scattering. For example, in the case where microparticles of a liquid crystal material having an ordinary refractive index of 1.5 and an extraordinary refractive index of 1.65 are dispersed in a polymer material having a refractive index of 1.5, there is no refractive index difference in the front direction (the direction of the normal to the PDLC), but the refractive index difference is large in the oblique direction. Therefore, the scattering property in the oblique direction is not allowed to be reduced, thereby causing low view angle characteristics. Further, in the case where an optical film such as a diffuser film is disposed on the light guide plate, oblique leak light is diffused also in the front direction by the diffuser film or the like, thereby causing an increase in light leakage in the front direction and a decrease in a modulation ratio in the front direction.

On the other hand, in the embodiment, as the bulk 34A and the microparticles 34B each include mainly an optical anisotropic material, the scattering property in an oblique direction is reduced, thereby enabling to improve transparency. For example, when the bulk 34A and the microparticles 34B include mainly the optical anisotropic materials with ordinary refractive indices which are equal to each other and extraordinary refractive indices which are also equal to each other, the directions of the optical axes of the bulk 34A and the microparticles 34B coincide with or substantially coincide with each other in a region where a voltage is not applied between the sub-electrodes 32A' and 32B'. Therefore, the refractive index difference is reduced or eliminated in all directions including the front direction (a direction of the normal to the light modulation device 30) and the oblique direction, thereby obtaining high transparency. As a result, the leakage of light in a range having a large view angle is allowed to be reduced or substantially eliminated, and view angle characteristics are allowed to be improved.

For example, when a liquid crystal having an ordinary refractive index of 1.5 and an extraordinary refractive index of 1.65, and a liquid crystal monomer having an ordinary refractive index of 1.5 and an extraordinary refractive index of 1.65 are mixed, and the liquid crystal monomer is polymerized in a state where the liquid crystal and the liquid crystal monomer are aligned by an alignment film or an electric field, the optical axis of the liquid crystal and the optical axis of a polymer formed by polymerizing the liquid crystal monomer coincide with each other. Therefore, the refractive indices are allowed to coincide with each other in all directions, thereby enabling to achieve a state where transparency is high, and to further improve the view angle characteristics.

Moreover, in the embodiment, for example, as illustrated in FIGS. 8(A) and (B), luminance in the transmission region 30A (luminance in black display) is lower, compared to the case where the light modulation device 30 is not included (indicated by the alternate long and short dash line in FIG. 8(B)). On the other hand, luminance in the scattering region 30B is significantly increased, compared to the case where the light modulation device 30 is not included (indicated by the alternate long and short dash line in FIG. 8(B)), and luminance in white display is partially increased (partial luminance enhancement) by a reduced amount of the luminance of the transmission region 30A.

The partial luminance enhancement is a technique of enhancing luminance when white display is partially performed, compared to the case where white display is performed on an entire screen. The partial luminance enhancement is generally used in a CRT, a PDP, or the like. However, in a liquid crystal display, as a backlight uniformly emits light in an entire surface thereof irrespective of an image, the luminance is not allowed to be partially enhanced. When an LED backlight in which a plurality of LEDs are two-dimensionally arranged is used as the backlight, some of the LEDs are allowed to be turned off. However, in such a case, diffusion light from dark regions in which the LEDs are turned off disappears; therefore, the luminance becomes lower, compared to the case where all of the LEDs are turned on. Also, the luminance may be increased by increasing a current applied to some LEDs which are turned on; however, in such a case, a large current flows for an extremely short time, thereby causing an issue in terms of load and reliability of a circuit.

On the other hand, in the embodiment, as the bulk 34A and the microparticles 34B each include mainly the optical anisotropic material, the scattering property in the oblique direction is suppressed to reduce leak light from the light guide plate in a dark state. Therefore, as light is guided from a part in a partially-dark state to a part in a partially-bright state, partial luminance enhancement is achievable without increasing electric power supplied to the backlight 1.

Moreover, in the embodiment, the electrode 32 is disposed on only the surface of the transparent substrate 31 in the pair of transparent substrates 31 and 36 which allow the light modulation layer 34 to be sandwiched therebetween. Therefore, for example, in the case where the electrode 32 is configured of an ITO film, a light absorption amount by the electrode 32 when light emitted from the light source 20 repeatedly passes through the electrode 32 in the light modulation device 30 while propagating through the light guide plate 10 is smaller, compared to the case where the electrodes are disposed on the surfaces of both of the transparent substrates 31 and 36 in the light modulation device 30. Further, as the light absorption amount by the electrode 32 is small, a change in chromaticity of illumination light in a plane is also small. As a result, chromaticity of illumination light is allowed to be further uniformized in a plane while suppressing a reduction in light extraction efficiency.

2. Second Embodiment

FIG. 12(A) is a sectional view illustrating an example of a schematic configuration of a backlight 2 (an illumination unit) according to a second embodiment of the invention. FIG. 12(B) is a sectional view illustrating an example of a specific configuration of the backlight 2 in FIG. 12(A). It is to be noted that FIGS. 12(A) and (B) are schematic illustrations, and dimensions and shapes in the illustrations are not necessarily the same as actual dimensions and shapes.

The backlight 2 according to the embodiment is distinguished from the backlight 1 according to the above-described first embodiment and modifications thereof by the fact that a light modulation device 60 is included instead of the light modulation device 30. Description will be given of, mainly, points different from the above-described embodiment, and points common to the above-described embodiment will not be further described.

In the embodiment, the light modulation device 60 is in close contact with a back side (the bottom surface) of the light guide plate 10 without an air layer in between, and is bonded to the back side of the light guide plate 10 with, for example, an adhesive (not illustrated) in between. For example, as illustrated in FIG. 12(B), the light modulation device 60 is configured by arranging the transparent substrate 31, the electrode 32, an alignment film 63, a light modulation layer 64, an alignment film 65, and the transparent substrate 36 in order from a side closer to the reflective plate 40.

The alignment films 63 and 65 align, for example, a liquid crystal or a monomer used in the light modulation layer 64. Kinds of alignment films include a vertical alignment film and a horizontal alignment film, and in the embodiment, vertical alignment films are used as the alignment films 63 and 65. The vertical alignment films may be made of a silane coupling material, polyvinyl alcohol (PVA), a polyimide-based material, a surfactant, or the like. Moreover, when plastic films are used as the transparent substrates 31 and 36, it is preferable that in a manufacturing process, a firing temperature after coating the surfaces of the transparent substrates 31 and 36 with the alignment films 63 and 65 be as low as possible; therefore, a silane coupling material capable of using an alcohol-based solvent is preferably used as the alignment films 63 and 65.

It is to be noted that as the vertical alignment films, vertical alignment films having a function of providing a pretilt to liquid crystal molecules in contact therewith may be used. Examples of a method of developing a pretilt function in the vertical alignment film include rubbing. The above-described vertical alignment films may have, for example, a function of allowing long axes of liquid crystal molecules in proximity to the vertical alignment film to intersect with a normal to the vertical alignment film at a slight angle.

However, when the vertical alignment films are used as the alignment films 63 and 65, as liquid crystal molecules included in microparticles 64B which will be described later, liquid crystal molecules having negative dielectric constant anisotropy (a so-called negative type liquid crystal) are used in some cases, but in the embodiment, liquid crystal molecules having positive dielectric constant anisotropy (a so-called positive type liquid crystal) are used.

Next, the light modulation layer 64 in the embodiment will be described below. For example, as illustrated in FIG. 12(B), the light modulation layer 64 is a composite layer including a bulk 64A and a plurality of microparticles 64B dispersed in the bulk 64A. The bulk 64A and the microparticles 64B have optical anisotropy.

Figure 13:
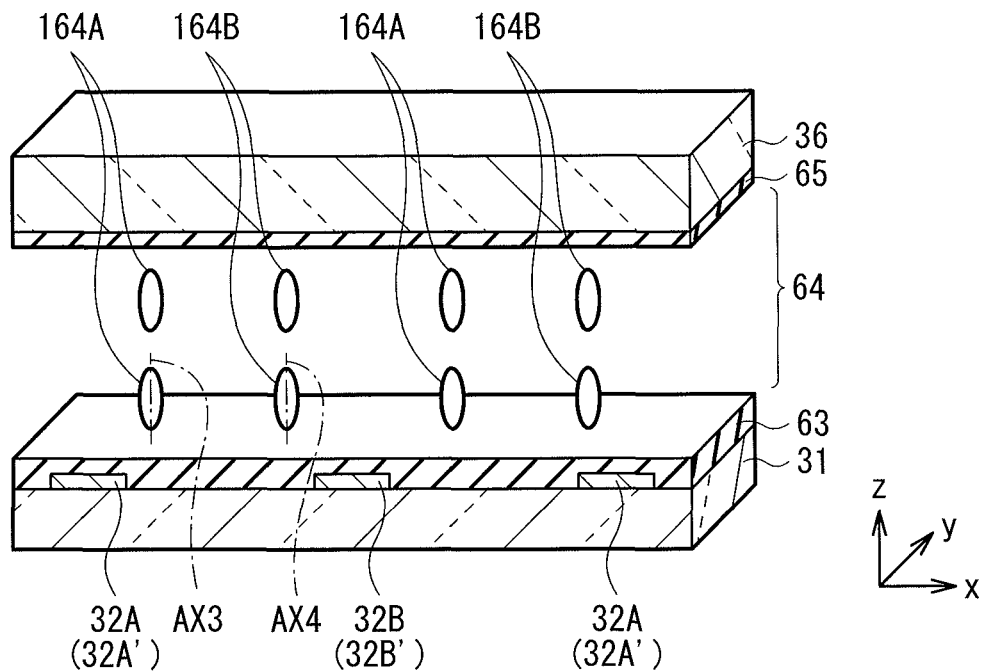
FIG. 13 is a schematic view for describing a configuration when a voltage is not applied to a light modulation device in FIG. 12.

FIG. 13 schematically illustrates an example of an alignment state in the bulk 64A and the microparticles 64B when a voltage is not applied between the first electrode 32A and the second electrode 32B (or the sub-electrodes 32A' and 32B'). An ellipsoid 164A in FIG. 13 represents an example of a refractive index ellipsoid exhibiting refractive index anisotropy of the bulk 64A when a voltage is not applied between the first electrode 32A and the second electrode 32B (or the sub-electrodes 32A' and 32B'). An ellipsoid 164B in FIG. 13 represents an example of a refractive index ellipsoid exhibiting refractive index anisotropy of the microparticle 64B when a voltage is not applied between the first electrode 32A and the second electrode 32B (or the sub-electrodes 32A' and 32B').

Figure 14:
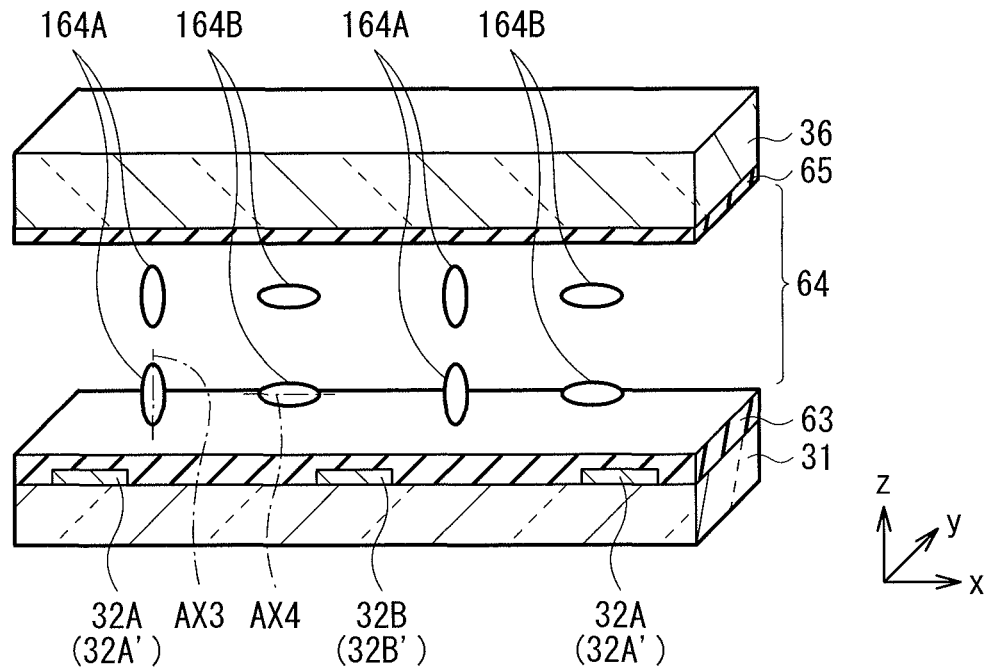
FIG. 14 is a schematic view for describing a configuration when a voltage is applied to the light modulation device in FIG. 12.

FIG. 14 schematically illustrates an example of an alignment state in the bulk 64A and the microparticles 64B when a voltage is applied between the first electrode 32A and the second electrode 32B (or the sub-electrodes 32A' and 32B'). An ellipsoid 164A in FIG. 14 represents an example of a refractive index ellipsoid exhibiting refractive index anisotropy of the bulk 64A when a voltage is applied between the first electrode 32A and the second electrode 32B (or the sub-electrodes 32A' and 32B'). An ellipsoid 164B in FIG. 14 represents an example of a refractive index ellipsoid exhibiting refractive index anisotropy of the microparticle 64B when a voltage is applied between the first electrode 32A and the second electrode 32B (or the sub-electrodes 32A' and 32B').

For example, as illustrated in FIG. 13, the bulk 64A and the microparticle 64B are structured to allow the direction of an optical axis AX3 of the bulk 64A (a long axis of the ellipsoid 164A) and the direction of an optical axis AX4 of the microparticle 64B (a long axis of the ellipsoid 164B) to coincide with (be parallel to) each other when a voltage is not applied between the first electrode 32A and the second electrode 32B (or the sub-electrodes 32A' and 32B'). It is to be noted that the optical axes AX3 and AX4 each indicate a line parallel to a travel direction of a light beam allowing a refractive index to have one value irrespective of polarization direction. Moreover, it is not necessary for the directions of the optical axis AX3 and the optical axis AX4 to consistently coincide with each other when a voltage is not applied between the first electrode 32A and the second electrode 32B (or the sub-electrodes 32A' and 32B'), and the direction of the optical axis AX3 and the direction of the optical axis AX4 may be slightly deviated from each other due to, for example, a manufacturing error.

Moreover, the optical axis AX4 is parallel to the light incident surface 10A of the light guide plate 10 as well as parallel to a normal to the surface of the transparent substrate 31 when a voltage is not applied between the first electrode 32A and the second electrode 32B (or the sub-electrodes 32A' and 32B'). In other words, when a voltage is not applied between the first electrode 32A and the second electrode 32B (or the sub-electrodes 32A' and 32B'), the optical axis AX4 is orthogonal to a plane including the first electrode 32A and the second electrode 32B (or the sub-electrodes 32A' and 32B').

On the other hand, the bulk 64A is structured to have a fixed optical axis AX3 irrespective of whether or not a voltage is applied between the first electrode 32A and the second electrode 32B (or the sub-electrodes 32A' and 32B'). More specifically, the optical axis AX3 is parallel to the light incident surface 10A of the light guide plate 10 as well as parallel to the normal to the surface of the transparent substrate 31. In other words, when a voltage is not applied between the first electrode 32A and the second electrode 32B (or the sub-electrodes 32A' and 32B'), the optical axis AX3 is parallel to the optical axis AX4.

It is to be noted that it is not necessary for the optical axis AX4 to be consistently parallel to the light incident surface 10A of the light guide plate 10 as well as the normal to the surface of the transparent substrate 31, and the optical axis AX4 may be aligned in a direction intersecting with one or both of the light incident surface 10A and the normal to the surface of the transparent substrate 31 at a small angle due to, for example, a manufacturing error.

In this case, ordinary refractive indices of the bulk 64A and the microparticle 64B are preferably equal to each other, and extraordinary refractive indices of the bulk 64A and the microparticle 64B are preferably equal to each other. In this case, for example, when a voltage is not applied between the first electrode 32A and the second electrode 32B (or the sub-electrodes 32A' and 32B'), there is little difference in refractive index in all directions including the front direction and the oblique direction, and high transparency is obtained. Therefore, for example, light toward the front direction and light toward the oblique direction pass through the light modulation layer 64 without being scattered in the light modulation layer 64. As a result, as illustrated in FIGS. 8(A) and (B), the light L from the light source 20 (light from the oblique direction) is totally reflected by an interface (an interface between the transparent substrate 31 or the light guide plate 10 and the air) of a transparent region (the transmission region 30A) in the light modulation device 60, and luminance (luminance in black display) of the transmission region 30A is decreased, compared to the case where the light modulation device 60 is not included (indicated by the alternate long and short dash line in FIG. 8(B)).

Moreover, for example, as illustrated in FIG. 14, the bulk 64A and the microparticle 64B are structured to allow the directions of the optical axis AX3 and the optical axis AX4 to be different from (intersect with or be orthogonal to) each other when a voltage is applied between the first electrode 32A and the second electrode 32B (or the sub-electrodes 32A' and 32B'). Further, for example, the microparticles 64B are structured to allow the optical axis AX4 to be parallel to the normal to the light incident surface 10A of the light guide plate 10 as well as parallel to the surface of the transparent substrate 31 when a voltage is applied between the first electrode 32A and the second electrode 32B (or the sub-electrodes 32A' and 32B'). In other words, when a voltage is applied between the first electrode 32A and the second electrode 32B (or the sub-electrodes 32A' and 32B'), the optical axis AX4 is parallel to a plane including the first electrode 32A and the second electrode 32B (or the sub-electrodes 32A' and 32B') as well as intersects with (or is orthogonal to) the extending direction of comb teeth of the sub-electrodes 32A' and 32B'.

Therefore, when a voltage is applied between the first electrode 32A and the second electrode 32B (or the sub-electrodes 32A' and 32B'), in the light modulation layer 64, a difference in refractive index in all directions in a plane which is parallel to the normal to the light incident surface 10A as well as is orthogonal to the surface of the transparent substrate 31 is increased to obtain a high scattering property. Accordingly, for example, light toward the front direction and light toward the oblique direction are scattered in the light modulation layer 64. As a result, for example, as illustrated in FIGS. 8(A) and (B), the light L from the light source 20 (light from the oblique direction) passes through an interface (an interface between the transparent substrate 31 or the light guide plate 10 and the air) of the scattering region 30B, and light having passed toward the reflective plate 40 is reflected by the reflective plate 40 to pass through the light modulation device 60. Therefore, the luminance of the scattering region 30B is extremely higher than that in the case where the light modulation device 60 is not included (indicated by the alternate long and short dash line in FIG. 8(B)), and luminance in white display is partially increased (partial luminance enhancement) by a reduced amount of the luminance of the transmission region 30A.

It is to be noted that the ordinary refractive indices of the bulk 64A and the microparticle 64B may be slightly different from each other due to, for example, a manufacturing error, and are preferably, for example, 0.1 or less, and more preferably 0.05 or less. Moreover, the extraordinary refractive indices of the bulk 64A and the microparticle 64B may be slightly different from each other due to, for example, a manufacturing error, and are preferably, for example, 0.1 or less, and more preferably 0.05 or less.

Moreover, a refractive index difference (=extraordinary refractive index−ordinary refractive index) in the bulk 64A and a refractive index difference (=extraordinary refractive index−ordinary refractive index) in the microparticle 64B are preferably as large as possible, and are preferably 0.05 or over, more preferably 0.1 or over, and still more preferably 0.15 or over. In the case where the refractive index differences in the bulk 64A and the microparticle 64B are large, the scattering power of the light modulation layer 64 is enhanced to allow light guide conditions to be easily disrupted, thereby allowing light from the light guide plate 10 to be easily extracted.

Further, the bulk 64A and the microparticle 64B have different response speeds with respect to an electric field. The bulk 64A has, for example, a streaky structure or a porous structure which does not respond to an electric field, or a rod-like structure having a response speed slower than that of the microparticle 64B. The bulk 64A is formed of, for example, a polymer material obtained by polymerizing a low-molecular monomer. The bulk 64A is formed, for example, by polymerizing, by one or both of heat and light, a material (for example, a monomer) with orientation and polymerization which is aligned along the alignment direction of the microparticles 64B or the alignment directions of the alignment films 63 and 65. On the other hand, the microparticles 64B mainly include, for example, a liquid crystal material, and have a response speed sufficiently higher than that of the bulk 64A. Examples of the liquid crystal material (liquid crystal molecules) included in the microparticles 64B include rod-like molecules.

In this case, when a voltage is not applied between the first electrode 32A and the second electrode 32B (the sub-electrodes 32A' and 32B'), the long-axis directions of the liquid crystal molecules in the microparticles 64B are parallel to the optical axis AX3. At this time, the long axes of the liquid crystal molecules in the microparticles 64B are parallel to the light incident surface 10A of the light guide plate 10 as well as parallel to the direction of the normal to the surface of the transparent substrate 31. Moreover, when a voltage is applied between the first electrode 32A and the second electrode 32B (or the sub-electrodes 32A' and 32B'), the long-axis directions of the liquid crystal molecules in the microparticles 64B intersect with (or are orthogonal to) the optical axis AX3. At this time, the long axes of the liquid crystal molecules in the microparticles 64B are parallel to the normal to the light incident surface 10A of the light guide plate 10 as well as parallel to the surface of the transparent substrate 31.

The above-described monomer having orientation and polymerization may be a material having optical anisotropy and forming a composite material with a liquid crystal; however, a low-molecular monomer which is cured with ultraviolet light is preferable in this embodiment. It is preferable that, in a state where no voltage is applied, directions of optical anisotropy of the liquid crystal and a resultant (a polymer material) formed by polymerizing a low-molecular monomer coincide with each other; therefore, before curing the low-molecular monomer with ultraviolet light, the liquid crystal and the low-molecular monomer are preferably aligned in the same direction. In the case where a liquid crystal is used as the microparticles 64B, when the liquid crystal includes rod-like molecules, the used monomer material preferably has a rod-like shape. As described above, a material having both of polymerization and liquid crystal properties is preferably used as the monomer material, and, for example, the monomer material preferably includes one or more functional groups selected from the group consisting of an acrylate group, a methacrylate group, an acryloyloxy group, a methacryloyloxy group, a vinyl ether group, and an epoxy group as polymerizable functional groups. These functional groups are allowed to be polymerized by ultraviolet, infrared, or electron irradiation, or by heating. To suppress a reduction in the degree of alignment under ultraviolet irradiation, a liquid crystal material having a polyfuncitonal group may be added. In the case where the bulk 64A has the above-described streaky structure, as the material of the bulk 64A, a bifunctional liquid crystal monomer is preferably used. Moreover, a monofunctional monomer may be added to the material of the bulk 64A to adjust a temperature at which liquid crystal properties are exhibited, or a tri- or more-functional monomer may be added to the material of the bulk 64A to improve crosslink density.

Next, functions and effects of the backlight 2 according to the embodiment will be described below.

In the backlight 2 according to the embodiment, a voltage is applied between the sub-electrodes 32A' and 32B' of respective light modulation cells 30S to allow the optical axes AX4 of the microparticles 64B in one light modulation cell 30S to be parallel or substantially parallel to the optical axis AX3 of the bulk 64A, and to allow the optical axes AX4 of the microparticles 64B in another light modulation cell 30S to intersect with or be orthogonal to the optical axis AX3 of the bulk 64A. As a result, light emitted from the light source 20 and entering into the light guide plate 10 passes through the transmission region 30A where the optical axes AX3 and AX4 are parallel or substantially parallel to each other of the light modulation device 60. On the other hand, light emitted from the light source 20 and entering into the light guide plate 10 is scattered in the scattering region 30B where the optical axes AX3 and AX4 intersect with or are orthogonal to each other of the light modulation device 60. Light having passed through a bottom surface of the scattering region 30B in the scattered light is reflected by the reflective plate 40 to be returned to the light guide plate 10 again, and then the light is emitted from a top surface of the backlight 2. Moreover, light toward a top surface of the scattering region 30B in the scattered light passes through the light guide plate 10, and then is emitted from the top surface of the backlight 2. Thus, in the embodiment, light is hardly emitted from the top surface of the transmission region 30A, and light is emitted from the top surface of the scattering region 30B. Accordingly, a modulation ratio in a front direction is increased.

On the other hand, in the embodiment, as the bulk 64A and the microparticles 64B each include mainly an optical anisotropic material, the scattering property in an oblique direction is reduced, thereby enabling to improve transparency. For example, the bulk 64A and the microparticles 64B include mainly the optical anisotropic materials with ordinary refractive indices which are equal to each other and extraordinary refractive indices which are also equal to each other, and in addition thereto, the directions of the optical axes of the bulk 64A and the microparticles 64B coincide with or substantially coincide with each other in a region where a voltage is not applied between the sub-electrodes 32A' and 32B'. Therefore, the refractive index difference is reduced or eliminated in all directions including the front direction (a direction of the normal to the light modulation device 60) and the oblique direction, thereby obtaining high transparency. As a result, the leakage of light in a range having a large view angle is allowed to be reduced or substantially eliminated, and view angle characteristics are allowed to be improved.

For example, when a liquid crystal having an ordinary refractive index of 1.5 and an extraordinary refractive index of 1.65, and a liquid crystal monomer having an ordinary refractive index of 1.5 and an extraordinary refractive index of 1.65 are mixed, and the liquid crystal monomer is polymerized in a state where the liquid crystal and the liquid crystal monomer are aligned by an alignment film or an electric field, the optical axis of the liquid crystal and the optical axis of a polymer formed by polymerizing the liquid crystal monomer coincide with each other. Therefore, the refractive indices coincide with each other in all directions, thereby enabling to achieve a state where transparency is high, and to further improve the view angle characteristics.

Moreover, in the embodiment, for example, as illustrated in FIGS. 8(A) and (B), luminance in the transmission region 30A (luminance in black display) is lower, compared to the case where the light modulation device 60 is not included (indicated by the alternate long and short dash line in FIG. 8(B)). On the other hand, luminance in the scattering region 30B is significantly increased, compared to the case where the light modulation device 60 is not included (indicated by the alternate long and short dash line in FIG. 8(B)), and luminance in white display is partially increased (partial luminance enhancement) by a reduced amount of the luminance of the transmission region 30A. It is because as the bulk 64A and the microparticles 64B each include mainly the optical anisotropic material, the scattering property in the oblique direction is suppressed to reduce leak light from the light guide plate in a dark state. Therefore, as light is guided from a part in a partially-dark state to a part in a partially-bright state, partial luminance enhancement is achievable without increasing electric power supplied to the backlight 2.

Moreover, in the embodiment, the electrode 32 is disposed on only the surface of the transparent substrate 31 in the pair of transparent substrates 31 and 36 which allow the light modulation layer 64 to be sandwiched therebetween. Therefore, for example, in the case where the electrode 32 is configured of an ITO film, a light absorption amount by the electrode 32 when light emitted from the light source 20 repeatedly passes through the electrode 32 in the light modulation device 60 while propagating through the light guide plate 10 is smaller, compared to the case where the electrodes are disposed on the surfaces of both of the transparent substrates 31 and 36 in the light modulation device 60. Further, as the light absorption amount by the electrode 32 is small, a change in chromaticity of illumination light in a plane is also small. As a result, chromaticity of illumination light is allowed to be further uniformized while suppressing a reduction in light extraction efficiency.

3. Modifications

First Modification

In the above-described embodiments, the comb teeth of the first electrode 32A and the second electrode 32B extend in a direction parallel to the extending direction of the light source 20; however, for example, as illustrated in FIGS. 15(A) and (B), they may extend in a direction intersecting with the extending direction of the light source 20. At this time, the first electrode 32A and the second electrode 32B each may be configured of, for example, a single structure formed on an entire surface of the transparent substrate 31 as illustrated in FIGS. 15(A) to (C), or may be configured of, for example, a plurality of structures (sub-electrodes 32A' and 32B') as illustrated in FIGS. 16(A) to (C).

Figure 17:
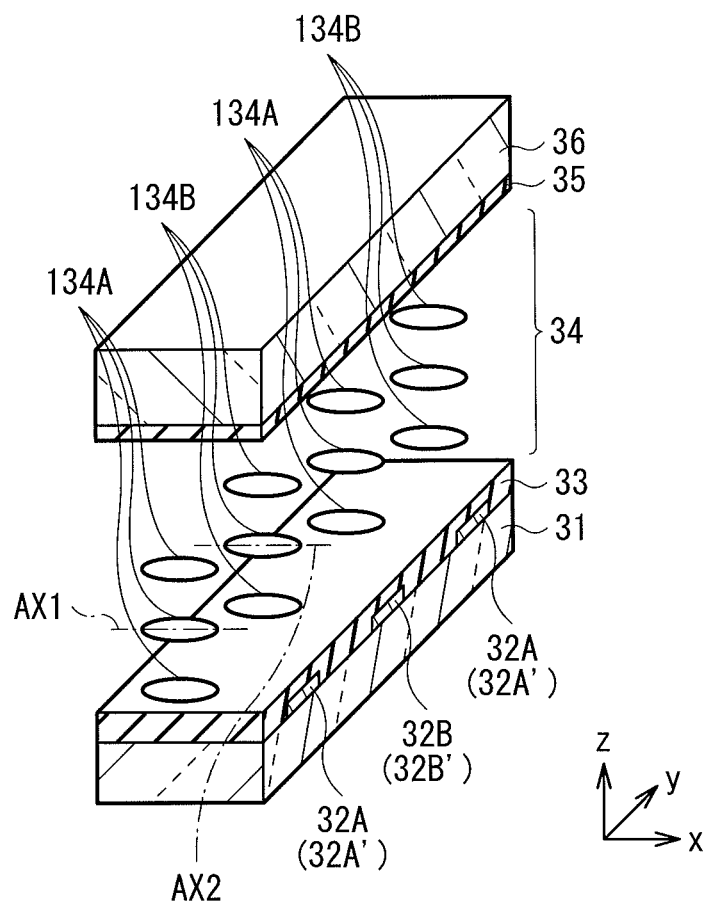
FIG. 17 is a schematic view for describing an example of a configuration when a voltage is not applied to the light modulation device in the case where the electrode has the configuration illustrated in FIGS. 15 and 16.
Figure 18:
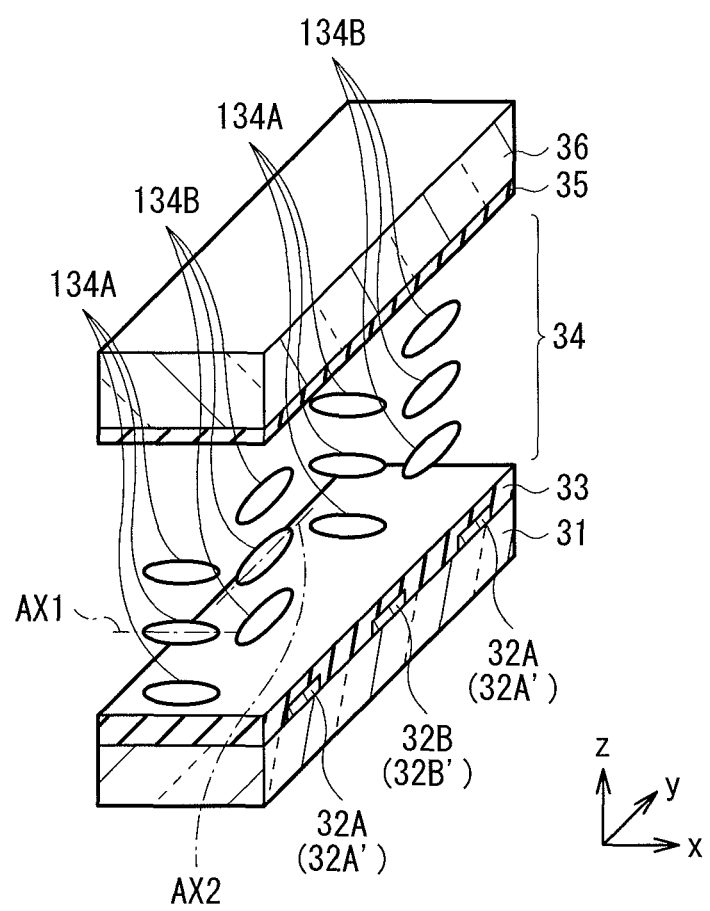
FIG. 18 is a schematic view for describing an example of a configuration when a voltage is applied to the light modulation device in the case where the electrode has the configuration illustrated in FIGS. 15 and 16.

FIG. 17 schematically illustrates an example of an alignment state in the bulk 34A and the microparticles 34B when a voltage is not applied to the first electrode 32A and the second electrode 32B (or the sub-electrodes 32A' and 32B'). FIG. 18 schematically illustrates an example of an alignment state in the bulk 34A and the microparticles 34B when a voltage is applied to the first electrode 32A and the second electrode 32B (or the sub-electrodes 32A' and 32B').

For example, as illustrated in FIG. 17, the bulk 34A and the microparticle 34B are structured to allow the direction of the optical axis AX1 of the bulk 34A (the long axis of the ellipsoid 134A) and the direction of the optical axis AX2 of the microparticle 34B (the long axis of the ellipsoid 134B) to coincide with (be parallel to) each other when a voltage is not applied between the first electrode 32A and the second electrode 32B (or the sub-electrodes 32A' and 32B').

Moreover, the optical axis AX2 is parallel to the normal to the light incident surface 10A of the light guide plate 10 as well as parallel to the surface of the transparent substrate 31 when a voltage is not applied between the first electrode 32A and the second electrode 32B (or the sub-electrodes 32A' and 32B'). In other words, when a voltage is not applied between the first electrode 32A and the second electrode 32B (or the sub-electrodes 32A' and 32B'), the optical axis AX2 is parallel to a plane including the first electrode 32A and the second electrode 32B (or the sub-electrodes 32A' and 32B') as well as parallel to the extending direction of the comb teeth of the first electrode 32A and the second electrode 32B (or the sub-electrodes 32A' and 32B'). It is to be noted that it is not necessary for the directions of the optical axis AX1 and the optical axis AX2 to consistently coincide with each other when a voltage is not applied between the first electrode 32A and the second electrode 32B (or the sub-electrodes 32A' and 32B'), and the direction of the optical axis AX1 and the direction of the optical axis AX2 may be slightly deviated from each other due to, for example, a manufacturing error.

On the other hand, for example, the bulk 34A is structured to have a fixed optical axis AX1 irrespective of whether or not a voltage is applied between the first electrode 32A and the second electrode 32B (or the sub-electrodes 32A' and 32B'). More specifically, the optical axis AX1 is parallel to the normal to the light incident surface 10A of the light guide plate 10 as well as parallel to the surface of the transparent substrate 31. In other words, when a voltage is not applied between the first electrode 32A and the second electrode 32B (or the sub-electrodes 32A' and 32B'), the optical axis AX1 is parallel to the optical axis AX2. It is to be noted that it is not necessary for the optical axis AX2 to be consistently parallel to the normal to the light incident surface 10A of the light guide plate 10 as well as the surface of the transparent substrate 31, and the optical axis AX2 may be aligned in a direction intersecting with one or both of the normal to the light incident surface 10A and the surface of the transparent substrate 31 at a small angle due to, for example, a manufacturing error.

Moreover, for example, as illustrated in FIG. 18, the bulk 34A and the microparticles 34B are structured to allow directions of the optical axes AX1 and AX2 to be different from (intersect with or be orthogonal to) each other when a voltage is applied between the first electrode 32A and the second electrode 32B (or the sub-electrodes 32A' and 32B'). Further, for example, the microparticles 34B are structured to allow the optical axis AX2 to be parallel to the light incident surface 10A of the light guide plate 10 as well as parallel to the surface of the transparent substrate 31 when a voltage is applied between the first electrode 32A and the second electrode 32B (or the sub-electrodes 32A' and 32B'). In other words, when a voltage is applied between the first electrode 32A and the second electrode 32B (or the sub-electrodes 32A' and 32B'), the optical axis AX2 is parallel to a plane including the first electrode 32A and the second electrode 32B (or the sub-electrodes 32A' and 32B') and intersects with (or is orthogonal to) the extending direction of comb teeth of the sub-electrodes 32A' and 32B'.

Figure 19:
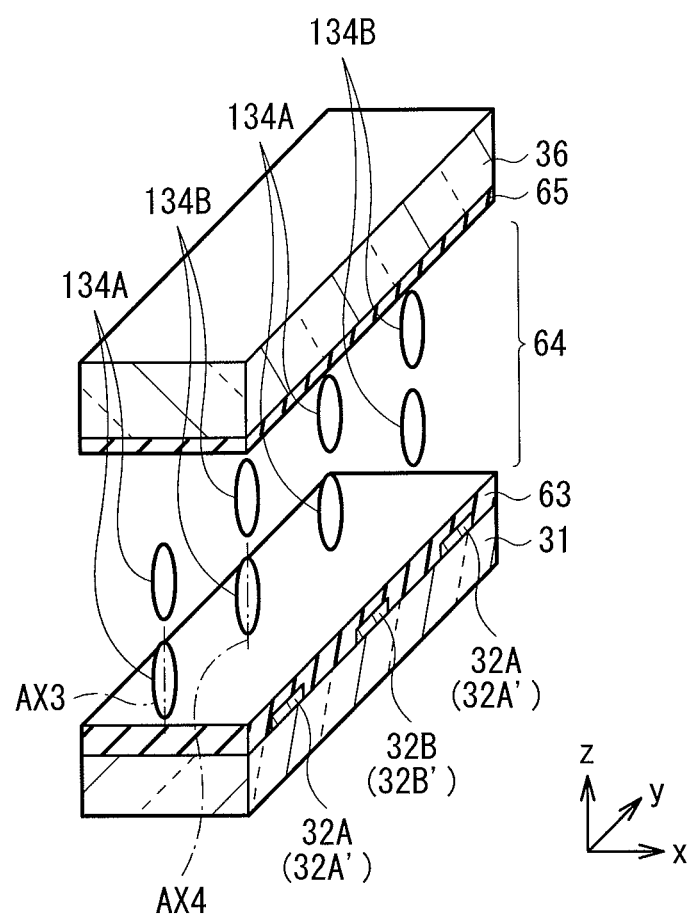
FIG. 19 is a schematic view for describing another example of the configuration when a voltage is not applied to the light modulation device in the case where the electrode has the configuration illustrated in FIGS. 15 and 16.
Figure 20:
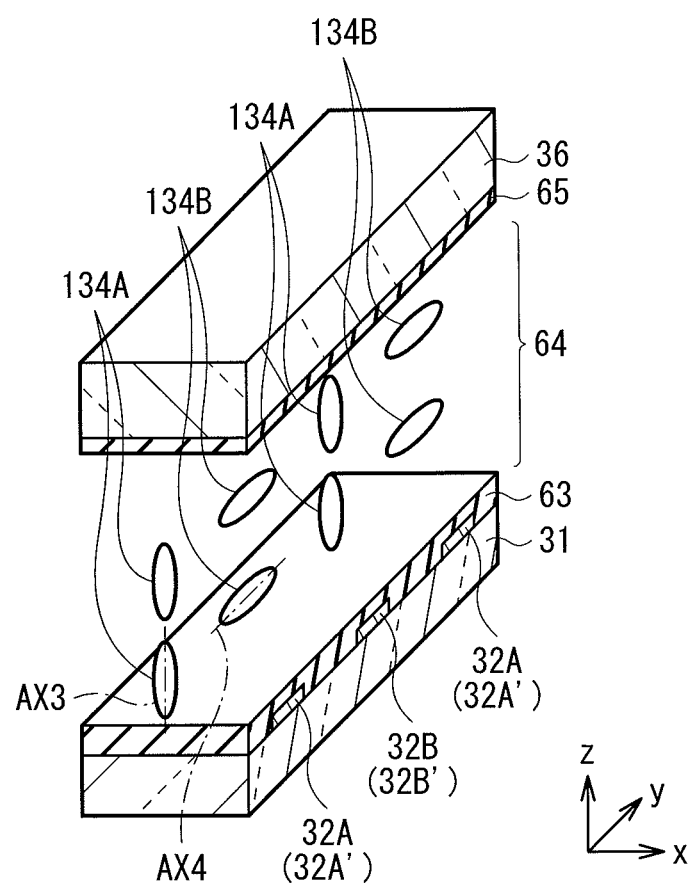
FIG. 20 is a schematic view for describing another example of the configuration when a voltage is applied to the light modulation device in the case where the electrode has the configuration illustrated in FIGS. 15 and 16.
Figure 21:
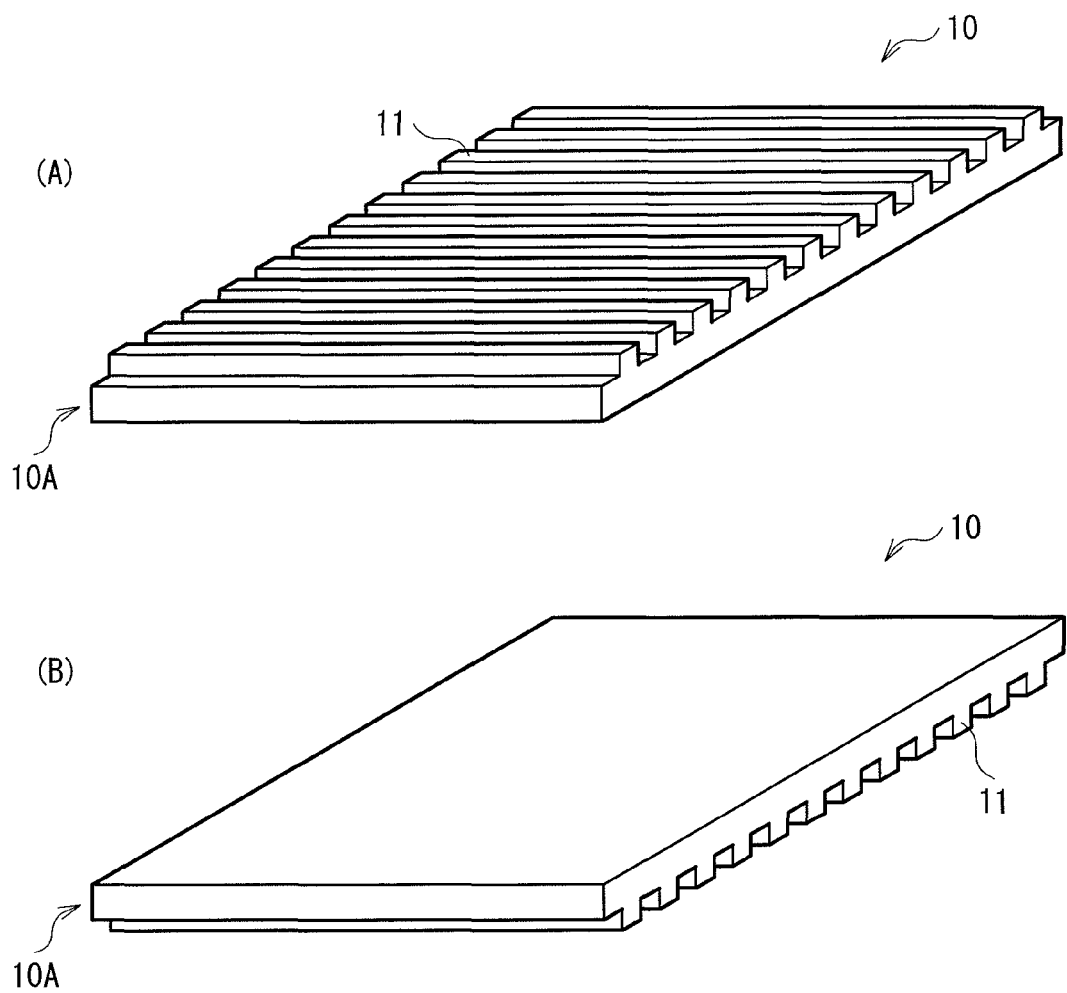
FIG. 21 is a perspective view illustrating a modification of a configuration of a light guide plate in FIGS. 1 and 12.
Figure 22:
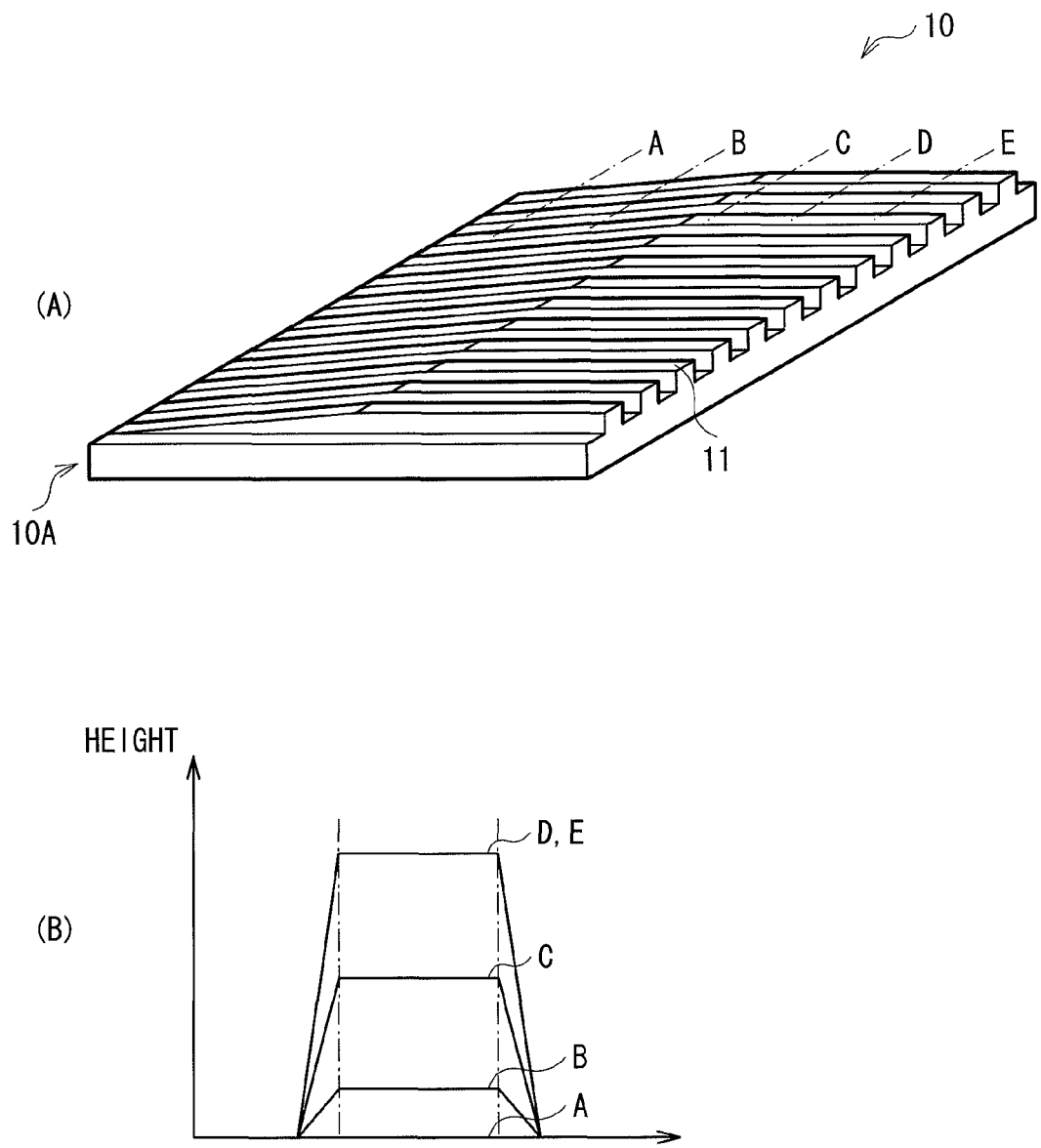
FIG. 22 is a perspective view illustrating another modification of the configuration of the light guide plate in FIGS. 1 and 12.
Figure 23:
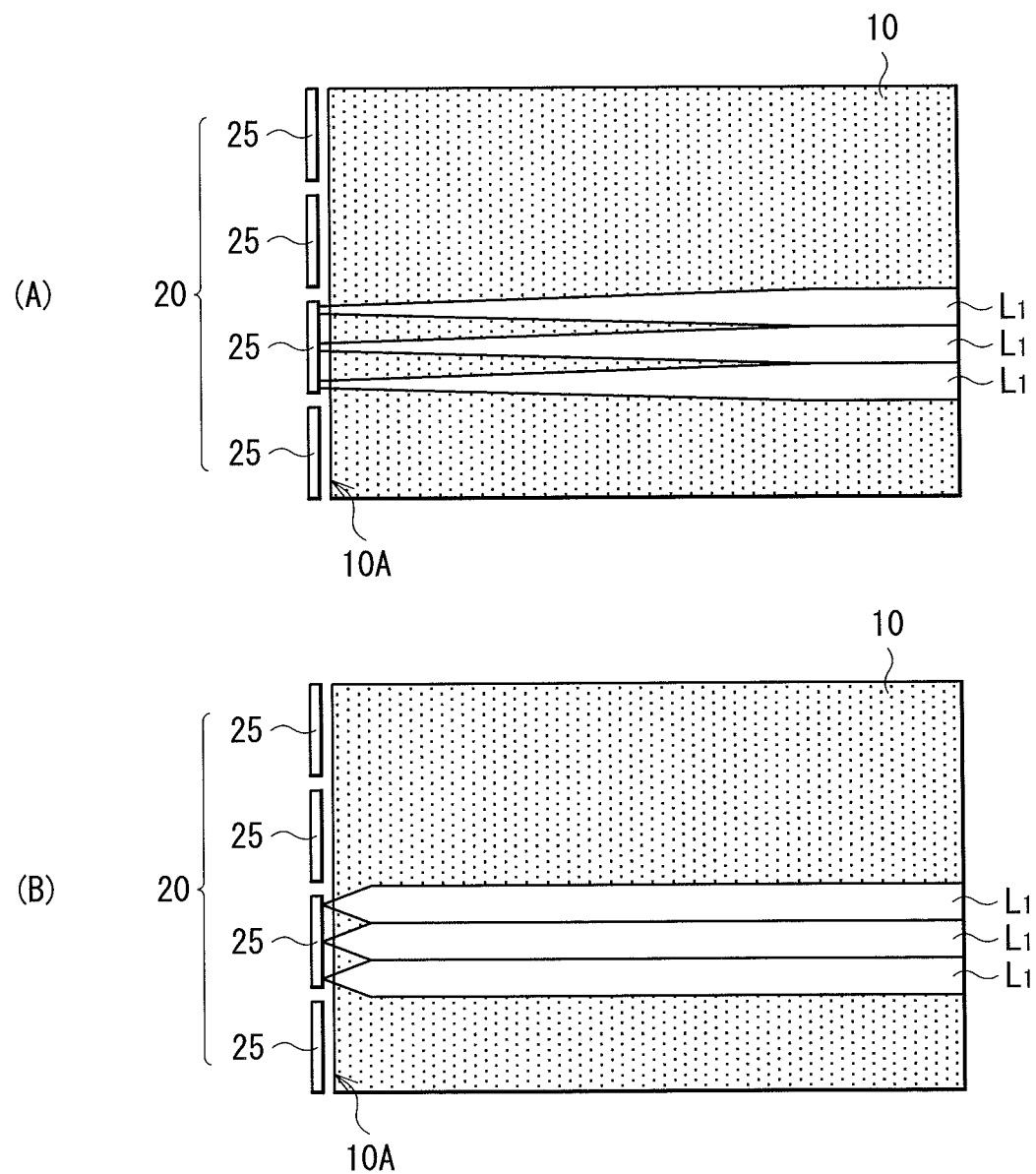
FIG. 23 is a schematic view illustrating a state where light propagates through the light guide plate in FIGS. 21 and 22.
Figure 24:
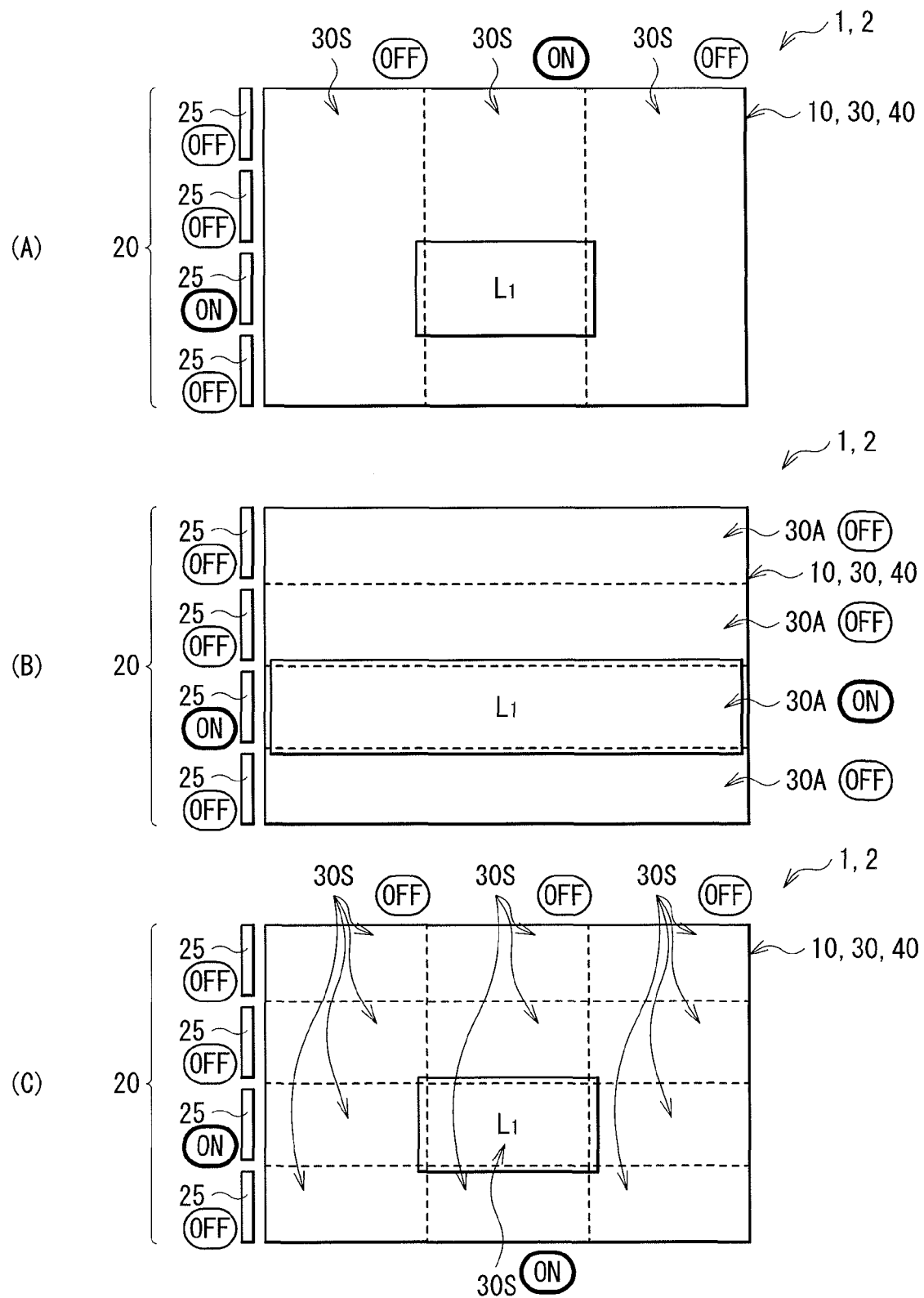
FIG. 24 is a schematic view illustrating a state where light is partially emitted from the light guide plate in FIGS. 21 and 22.

FIG. 19 schematically illustrates an example of an alignment state in the bulk 64A and the microparticles 64B in the above-described modification when a voltage is not applied to the first electrode 32A and the second electrode 32B (or the sub-electrodes 32A' and 32B'). FIG. 20 schematically illustrates an example of an alignment state in the bulk 64A and the microparticles 64B in the above-described modification when a voltage is applied between the first electrode 32A and the second electrode 32B (or the sub-electrodes 32A' and 32B').

For example, as illustrated in FIG. 19, the bulk 64A and the microparticle 64B are structured to allow the direction of the optical axis AX3 of the bulk 64A (the long axis of the ellipsoid 164A) and the direction of the optical axis AX4 of the microparticle 64B (the long axis of the ellipsoid 164B) to coincide with (be parallel to) each other when a voltage is not applied between the first electrode 32A and the second electrode 32B (or the sub-electrodes 32A' and 32B'). Moreover, it is not necessary for the directions of the optical axis AX3 and the optical axis AX4 to consistently coincide with each other when a voltage is not applied between the first electrode 32A and the second electrode 32B (or the sub-electrodes 32A' and 32B'), and the direction of the optical axis AX3 and the direction of the optical axis AX4 may be slightly deviated from each other due to, for example, a manufacturing error.

Moreover, the optical axis AX4 is parallel to the light incident surface 10A of the light guide plate 10 as well as parallel to the normal to the surface of the transparent substrate 31 when a voltage is not applied between the first electrode 32A and the second electrode 32B (or the sub-electrodes 32A' and 32B'). In other words, when a voltage is not applied between the first electrode 32A and the second electrode 32B (or the sub-electrodes 32A' and 32B'), the optical axis AX4 is orthogonal to a plane including the first electrode 32A and the second electrode 32B (or the sub-electrodes 32A' and 32B').

On the other hand, the bulk 64A is structured to have a fixed optical axis AX3 irrespective of whether or not a voltage is applied between the first electrode 32A and the second electrode 32B (or the sub-electrodes 32A' and 32B'). More specifically, the optical axis AX3 is parallel to the light incident surface 10A of the light guide plate 10 as well as parallel to the normal to the surface of the transparent substrate 31. In other words, when a voltage is not applied between the first electrode 32A and the second electrode 32B (or the sub-electrodes 32A' and 32B'), the optical axis AX3 is parallel to the optical axis AX4.

It is to be noted that it is not necessary for the optical axis AX4 to be consistently parallel to the light incident surface 10A of the light guide plate 10 as well as the normal to the surface of the transparent substrate 31, and the optical axis AX4 may be aligned in a direction intersecting with one or both of the light incident surface 10A and the normal to the surface of the transparent substrate 31 at a small angle due to, for example, a manufacturing error.

Moreover, for example, as illustrated in FIG. 20, the bulk 64A and the microparticles 64B are structured to allow directions of the optical axis AX3 and the optical axis AX4 to be different from (intersect with or be orthogonal to) each other when a voltage is applied between the first electrode 32A and the second electrode 32B (or the sub-electrodes 32A' and 32B'). Further, for example, the microparticles 64B are structured to allow the optical axis AX4 to be parallel to the light incident surface 10A of the light guide plate 10 as well as parallel to the surface of the transparent substrate 31 when a voltage is applied between the first electrode 32A and the second electrode 32B (or the sub-electrodes 32A' and 32B'). In other words, when a voltage is applied between the first electrode 32A and the second electrode 32B (or the sub-electrodes 32A' and 32B'), the optical axis AX4 is parallel to a plane including the first electrode 32A and the second electrode 32B (or the sub-electrodes 32A' and 32B') as well as intersects with (or is orthogonal to) the extending direction of comb teeth of the sub-electrodes 32A' and 32B'.

In the above-described modification, when the alignment states in the bulk 34A and the microparticles 34B or the alignment states in the bulk 64A and the microparticles 64B are as illustrated in the above FIGS. 17 to 19, the luminance in the scattering region 30B is significantly increased, compared to the case where the light modulation devices 30 and 60 are not included (indicated by the alternate long and short dash line in FIG. 8(B)), and luminance in white display is partially increased (partial luminance enhancement) by a reduced amount of the luminance of the transmission region 30A.

Moreover, in the above-described modification, as in the case of the above-described embodiments and the like, the electrode 32 is disposed on only the surface of the transparent substrate 31 in the pair of transparent substrates 31 and 36. Therefore, for example, in the case where the electrode 32 is configured of an ITO film, a light absorption amount by the electrode 32 when light emitted from the light source 20 repeatedly passes through the electrode 32 in the light modulation device 30 or 60 while propagating through the light guide plate 10 is smaller, compared to the case where the electrodes are disposed on the surfaces of both of the transparent substrates 31 and 36 in the light modulation device 30 or 60. Further, as the light absorption amount by the electrode 32 is small, a change in chromaticity of illumination light in a plane is also small. As a result, chromaticity of illumination light is allowed to be further uniformized while suppressing a reduction in light extraction efficiency.

Second Modification

In the above-described embodiments and modifications thereof, as the light guide plate 10, a light guide plate with a pattern shape allowing light incident from the light incident surface 10A to be scattered to be uniformized, or a flat light guide plate without such a pattern shape is used; however, for example, as illustrated in FIG. 21(A), a light guide plate having a plurality of strip-like projections 11 on a top surface thereof may be used. It is to be noted that, for example, as illustrated in FIG. 21(B), the light guide plate 10 may have a plurality of strip-like projections 11 on a bottom surface thereof. Moreover, for example, the light guide plate 10 may have a plurality of strip-like projections 11 in the light guide plate 10 (not illustrated). Further, the light guide plate 10 may be hollow, or may be densely packed.

The respective projections 11 extend in a direction parallel to the normal to the light incident surface 10A, and, for example, as illustrated in FIGS. 21(A) and (B), the projections 11 are successively formed from one side surface of the light guide plate 10 to another side surface facing the side surface. A section in an arrangement direction of each of the projections 11 has, for example, a rectangular shape, a trapezoidal shape, or a triangular shape. In the case where the section in the arrangement direction of each projection 11 has a rectangular shape, a rectilinear propagation property of light is extremely high, and the projections 11 are suitable for a large-scale backlight. In the case where the section in the arrangement direction of each projection 11 has a trapezoidal shape, processing of a die used to form each projection 11 by injection molding, extrusion molding, heat-press molding, or the like is easy, and mold releasability in molding is high, and yields and molding speed are allowed to be improved because of a reduction in defects.

A flat surface may or may not be disposed between adjacent projections 11. The height of each of the projections 11 may be uniform or nonuniform in a plane. For example, as illustrated in FIG. 22(A), when one side surface of the light guide plate 10 is the light incident surface 10A, the height of each of the projections 11 may be smaller on a side closer to the light incident surface 10A, and be higher on a side closer to a side surface facing the light incident surface 10A. Moreover, for example, although not illustrated, when a pair of facing side surfaces of the side surfaces of the light guide plate 10 are light incident surfaces 10A, the height of each of the projections 11 may be lower at and in proximity to both of the light incident surfaces 10A, and be higher in other regions. The height at and in proximity to the light incident surface 10A of each of the projections 11 may be zero or substantially zero. For example, as illustrated in FIG. 22(B), the height of each of the projections 11 may be increased from a side closer to the light incident surface 10A to a side surface facing the light incident surface 10A. At this time, the height of each of the projections 11 may be uniform in a midway from the light incident surface 10A to the side surface facing the light incident surface 10A. It is to be noted that a plurality of projections 11 with a nonuniform height as illustrated in FIGS. 22(A) and (B) may be disposed in a region other than the top surface of the light guide plate 10, and, for example, the plurality of projections 11 with a nonuniform height may be disposed on the bottom surface of the light guide plate 10 or in the light guide plate 10.

As described above, when the height of each of the projections 11 (in other words, the depth of a groove formed between the projections 11) varies, the rectilinear propagation property of light is allowed to vary. For example, as illustrated in FIGS. 21(A) and (B), in the case where the projections 11 are disposed on and in proximity to the light incident surface 10A, and the light source 20 is configured of a plurality of light source blocks 25 capable of being driven independently of one another, for example, as illustrated in FIG. 23(A), when one light source block 25 illuminates, light L1 emitted from the light source block 25 propagates through the light guide plate 10 while not spreading too much in a horizontal direction (a width direction). In this case, a dark region may be generated between the point-like light sources 21 in proximity to the light incident surface 10A, and in this case, image quality may be degraded. Therefore, in such a case, for example, as illustrated in FIGS. 22(A) and (B), the height of each of the projections 11 is preferably lower or zero at and in proximity to the light incident surface 10A. In doing so, for example, as illustrated in FIG. 23(B), the light L1 emitted from the light source block 25 is allowed to be spread in the horizontal direction (the width direction) at a divergent angle of the point-like light source 23 at and in proximity to the light incident surface 10A, thereby enabling to propagate with a substantially uniform width in a region farther from the light incident surface 10A.

In this case, in the case were the electrode 32 is configured of a plurality of sub-electrode pairs 32C, when light emitted from the light source block 25 propagates through the light guide plate 10 as described above, partial lighting is allowed to be performed by applying a voltage to one sub-electrode pair 32C.

For example, in the case where the plurality of sub-electrode pairs 32C (light modulation cells 30S) extend in a direction parallel to the light incident surface 10A and are arranged in a direction parallel to the normal to the light incident surface 10A, and a voltage is applied to only one light modulation cell 30S, as illustrated in FIG. 24(A), the light L1 emitted from one light source block 25 is mostly emitted from a section where light emitted from one light source block 25 passes of the light modulation cell 30S to which the voltage is applied. In this case, in a section profile of luminance in a direction parallel to the light incident surface 10A in FIG. 24(A), a boundary between a lighting section and a nonlighting section is moderately blurred; therefore, it is difficult to visually identify the boundary. As a result, contrast is allowed to be improved without reducing image quality.

Moreover, for example, in the case were the plurality of sub-electrode pairs 32C (the light modulation cells 30S) extend in a direction parallel to the normal to the light incident surface 10A and are arranged in a direction parallel to the light incident surface 10A, and a voltage is applied to only one light modulation cell 30S, as illustrated in FIG. 24(B), the light L1 emitted from one light source block 25 is mostly emitted from a section where light emitted from one light source block 25 passes (for example, the entire light modulation cell 30S to which the voltage is applied) of the light modulation cell 30S to which the voltage is applied.

Further, for example, in the case where the plurality of sub-electrode pairs 32C (the light modulation cells 30S) are two-dimensionally arranged and a voltage is applied to only one light modulation cell 30S, as illustrated in FIG. 24(C), the light L1 emitted from one light source block 25 is mostly emitted from a section where light emitted from one light source block 25 passes (for example, the entire light modulation cell 30S to which the voltage is applied) of the light modulation cell 30S to which the voltage is applied.

Figure 25:
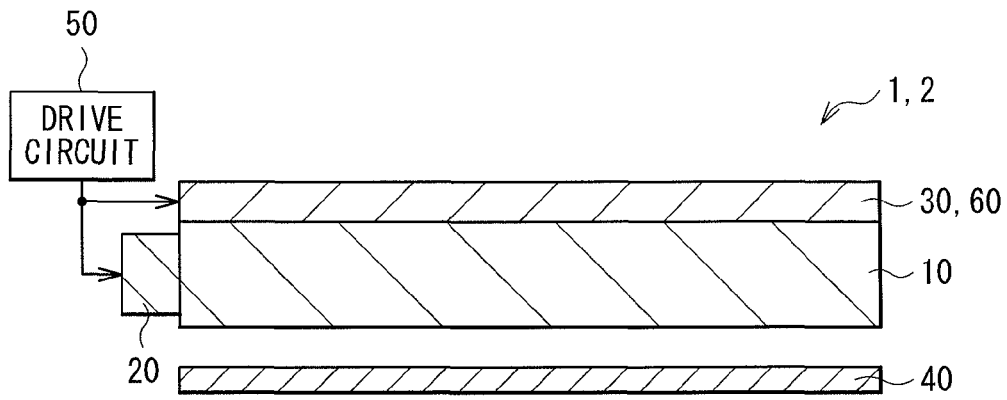
FIG. 25 is a sectional view illustrating a first modification of the configuration of the backlight in FIGS. 1 and 12.
Figure 26:
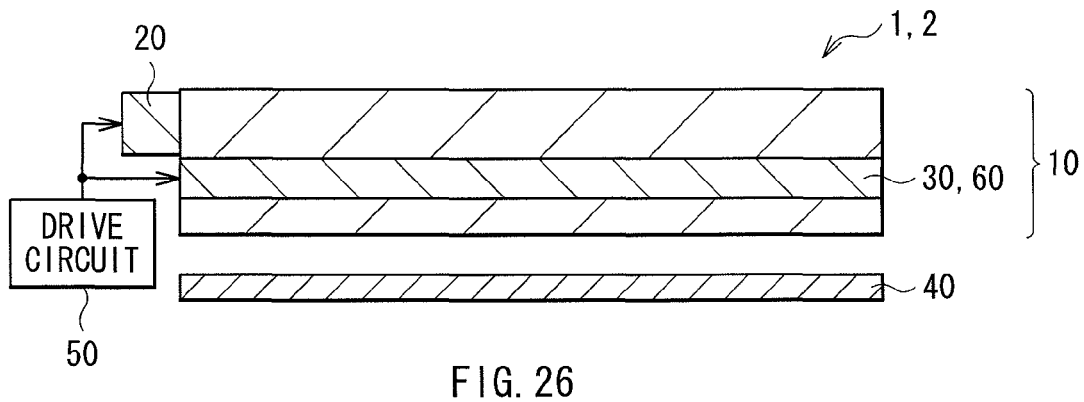
FIG. 26 is a sectional view illustrating a second modification of the configuration of the backlight in FIGS. 1 and 12.

In the above-described respective examples, in the case where the height of each of the projections 11 of the light guide plate 10 is smaller at and in proximity to the light incident surface 10A, even if a voltage is applied to the light modulation cells 30S in proximity to the light incident surface 10A to allow the light L1 to be emitted from a section in proximity to the light incident surface 10A, in-plane luminance of the light L1 (illumination light) emitted from the light modulation cells 30A is allowed to be further uniformized Third Modification In the above-described embodiments and modifications thereof, the light modulation devices 30 and 60 each are in close contact with and are bonded to the back side (the bottom surface) of the light guide plate 10 without an air layer in between; however, for example, as illustrated in FIG. 25, the light modulation devices 30 and 60 each may be in close contact with and bonded to the top surface of the light guide plate 10 without an air layer in between. Moreover, for example, as illustrated in FIG. 26, the light modulation devices 30 and 60 each may be disposed in the light guide plate 10. However, also in this case, it is necessary for the light modulation devices 30 and 60 to be in close contact with and bonded to the light guide plate 10 without an air layer in between.

Figure 27:
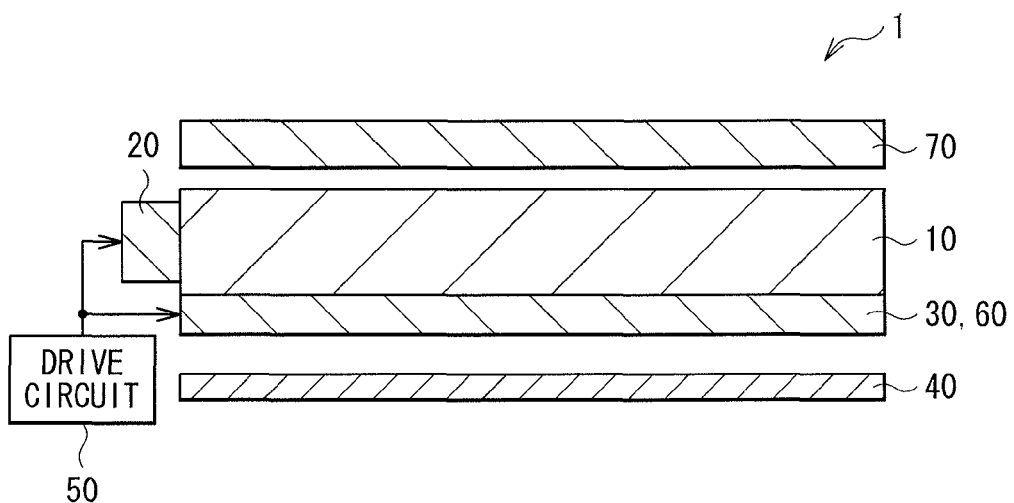
FIG. 27 is a sectional view illustrating a third modification of the configuration of the backlight in FIGS. 1 and 12.

Moreover, in the above-described embodiments, no component is specifically disposed on the light guide plate 10; however, for example, as illustrated in FIG. 27, an optical sheet 70 (for example, a diffuser plate, a diffuser sheet, a lens film, a polarization splitter sheet, or the like) may be disposed. In such a case, a part of light emitted from the light guide plate 10 in an oblique direction rises in the front direction; therefore, a modulation ratio is allowed to be effectively improved.

Fourth Modification

Moreover, in the above-described respective embodiments and modifications thereof, one or both of the transparent substrate 31 and the transparent substrate 37 may be integrally formed with the light guide plate 10. For example, in the above-described embodiments and modifications thereof, in the case where the transparent substrate 37 is in contact with the light guide plate 10, the transparent substrate 37 may be integrally formed with the light guide plate 10. At this time, the transparent substrate 37 corresponds to a specific example of "first transparent substrate" or "second transparent substrate". Moreover, for example, in the above-described respective embodiments and modifications thereof, in the case where the transparent substrate 31 is in contact with the light guide plate 10, the transparent substrate 31 may be integrally formed with the light guide plate 10. At this time, the transparent substrate 31 corresponds to a specific example of "first transparent substrate" or "second transparent substrate". Further, for example, in the above-described respective embodiments and modifications thereof, in the case where the transparent substrates 31 and 37 are in contact with the light guide plate 10, the transparent substrates 31 and 37 may be integrally formed with the light guide plate 10. At this time, the transparent substrate 31 or the transparent substrate 37 corresponds to a specific example of "first transparent substrate" or "second transparent substrate".

Application Example

Next, an application example of the backlights 1 and 2 according to the above-described embodiments will be described below.

Figure 28:
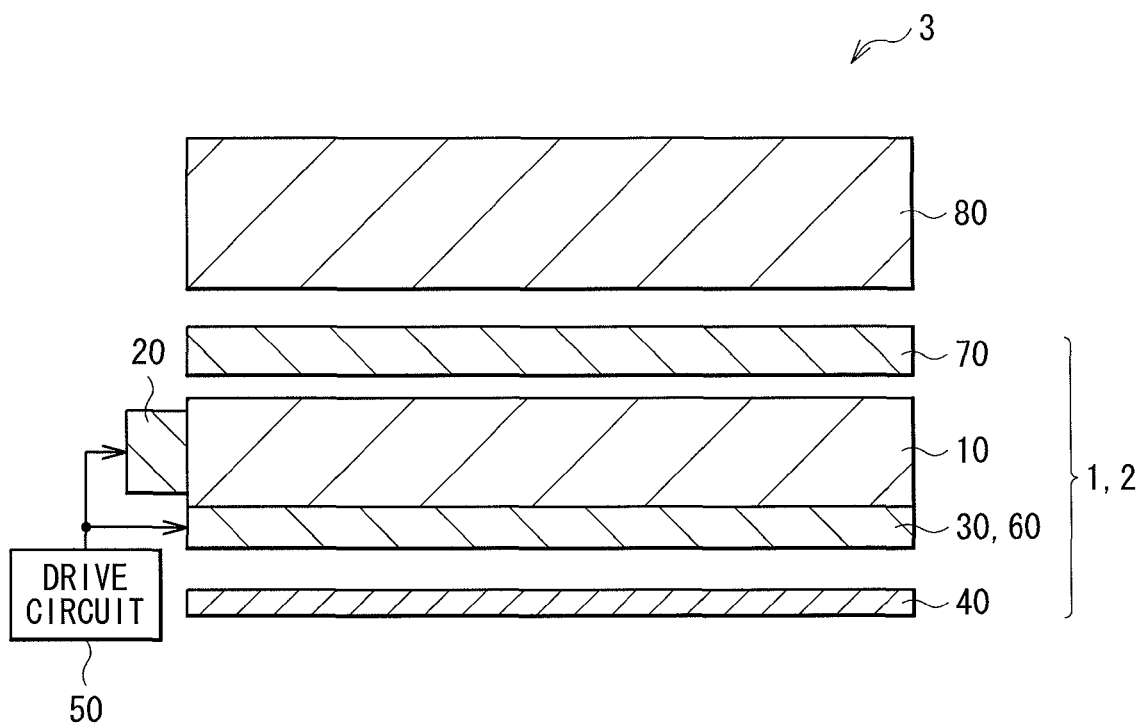
FIG. 28 is a sectional view illustrating an example of a display as an application example.

FIG. 28 illustrates an example of a schematic configuration of a display 3 according to the application example. The display 3 includes a display panel 80, and the backlight 1 or 2 disposed behind the display panel 80.

The display panel 80 displays an image. The display panel 80 includes a plurality of pixels which are arranged in a matrix, and is allowed to display an image by driving the plurality of pixels based on an image signal. The display panel 80 is, for example, a transmissive liquid crystal display panel, and has a configuration in which a liquid crystal layer is sandwiched between a pair of transparent substrates. Although not illustrated, the display panel 80 includes, for example, a polarizer, a transparent substrate, pixel electrodes, an alignment film, a liquid crystal layer, an alignment film, a common electrode, a color filter, a transparent substrate, and a polarizer in order from a side closer to the backlight 1 or 2.

The transparent substrates are configured of substrates transparent to visible light, for example, plate glass. It is to be noted that an active drive circuit (not illustrated) including TFTs (thin film transistors), wiring, and the like electrically connected to the pixel electrodes is formed on the transparent substrate located closer to the backlight 1. The pixel electrodes and the common electrode are made of, for example, indium tin oxide (ITO). The pixel electrodes are arranged in a lattice arrangement or a delta arrangement on the transparent substrate, and function as electrodes for respective pixels. On the other hand, the common electrode is formed on an entire surface of the color filter, and functions as a common electrode facing the respective pixel electrodes. The alignment films are made of a polymer material such as polyimide, and perform an alignment process on a liquid crystal. The liquid crystal layer is made of, for example, a VA (Vertical Alignment) mode, TN (Twisted Nematic) mode or STN (Super Twisted Nematic) mode liquid crystal, and has a function of changing the direction of a polarizing axis of emitted light from the backlight 1 or 2 in each pixel by a voltage applied from the drive circuit (not illustrated). It is to be noted that liquid crystal alignment is changed in a stepwise manner to adjust the direction of a transmission axis of each pixel in a stepwise manner. In the color filter, color filters separating light having passed through the liquid crystal layer into, for example, three primary colors of red (R), green (G), and blue (B), or four colors such as R, G, B, and white (W), respectively, are arranged corresponding to the arrangement of the pixel electrodes. Typical filter arrangements (pixel arrangements) include a stripe arrangement, a diagonal arrangement, a delta arrangement, and a rectangular arrangement.

The polarizers are optical shutters of one kind, and allow only light (polarized light) in a certain vibration direction to pass therethrough. It is to be noted that the polarizers may be absorption polarizers absorbing light (polarized light) in a vibration direction other than a transmission axis, but the polarizers are preferably reflective polarizers reflecting light toward the backlight 1 or 2 in terms of an improvement in luminance. The polarizers are disposed to allow their polarizing axes to be different by 90° from each other, thereby allowing emitted light from the backlight 1 to pass therethrough via the liquid crystal layer, or to be shielded.

For example, the drive circuit 50 controls the magnitude of a voltage applied to the sub-electrodes 32A' and 32B' of each of the light modulation cells 30S to allow the optical axes AX2 or AX4 of the microparticles 34B or 64B in a cell corresponding to a black-display pixel position of the plurality of light modulation cells 30S to be parallel to the optical axis AX1 or AX3 of the bulk 34A or 64A, as well as to allow the optical axes AX2 or AX4 of the microparticles 34B or 64B in a cell corresponding to a white-display pixel position of the plurality of light modulation cells 30S to intersect with the optical axis AX1 or AX3 of the bulk 34A or 64A.

In the application example, as a light source applying light to the display panel 80, the backlight 1 or 2 according to the above-described embodiments is used. Therefore, while the leakage of light in a range having a large view angle is allowed to be reduced or substantially eliminated, display luminance is allowed to be improved. As a result, a modulation ratio in a front direction is allowed to be increased. Moreover, partial luminance enhancement is achievable without increasing electric power supplied to the backlight 1 or 2.

Moreover, in the application example, the backlight 1 or 2 partially modulates intensity of light entering into the display panel 80 based on a display image. However, when an abrupt change in brightness occurs in pattern edge sections of the sub-electrodes 32A' and 32B' included in the light modulation device 30 or 60, a boundary section thereof is observed even in a display image. Therefore, a characteristic, called blur characteristic, is demanded to change brightness at an electrode boundary section as monotonously as possible. A diffuser plate with high diffusibility is effectively used to enhance the blur characteristic; however, when diffusibility is high, total light beam transmittance is reduced, thereby causing a tendency to reduce brightness. Therefore, in the application example, when a diffuser plate is used as the optical sheet 70, the total light beam transmittance of the diffuser plate is preferably 50% to 85%, and more preferably 60% to 80%. Moreover, the blur characteristic is improved with an increase in spatial distance between the light guide plate 10 and the diffuser plate in the backlight 1 or 2.

Further, in the case where a light guide plate including a plurality of projections 11 on a top surface thereof is used as the light guide plate 10, and an electrode configured of a plurality of sub-electrode pairs 32C is used as the electrode 32, and a plurality of light source blocks 25 capable of being driven independently of one another are used as the light source 20, when only some of the light source blocks 25 illuminate and a voltage is applied to some of the sub-electrode pairs 32C, the blur characteristic is improved. Moreover, when the number of sub-electrode pairs 32C included in the light modulation device 30 is increased and a voltage applied to respective sub-electrode pairs 32C is adjusted to change lightness or darkness as monotonously as possible, the blur characteristic is improved.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An illumination unit comprising:
    a first transparent substrate and a second transparent substrate disposed to be separated from and face each other;
    a light source emitting light to an end surface of the first transparent substrate or the second transparent substrate;
    an electrode disposed on a surface of the first transparent substrate or the second transparent substrate and generating an electric field in a direction parallel to the surface of the first transparent substrate;
    a light modulation layer disposed in a gap between the first transparent substrate and the second transparent substrate and exhibiting a scattering property or transparency with respect to light from the light source, depending on magnitude of the electric field; and
    a drive circuit applying a voltage to the electrode,
    wherein the electrode includes a plurality of separately driven sub-electrode groups, each sub-electrode group including a first electrode having comb teeth which extend in a first direction and a second electrode having comb teeth which are disposed alternately with the comb teeth of the first electrode,
    wherein a plurality of the sub-electrode groups are arranged in a direction normal to a side surface facing the light source of side surfaces of the first transparent substrate such that the drive circuit may independently apply voltages to the respective sub-electrode groups according to a distance from the light source.

2. The illumination unit according to claim 1, wherein the comb teeth of the first and second electrodes extend in a direction parallel to a side surface facing the light source of side surfaces of the first transparent substrate.

3. The illumination unit according to claim 1, wherein the comb teeth of the first and second electrodes extend in a direction parallel to a normal to a side surface facing the light source of side surfaces of the first transparent substrate.

4. The illumination unit according to claim 1, wherein the plurality of sub-electrode groups are two-dimensionally arranged.

5. The illumination unit according to claim 1, wherein the drive circuit applies a voltage to respective sub-electrode groups, the voltage being modulated according to the distance from the light source and an image signal.

6. The illumination unit according to claim 1, wherein the light source is configured of a plurality of light source blocks capable of being driven independently of one another.

7. The illumination unit according to claim 6, wherein the drive circuit applies, to respective light source blocks, a voltage or a current being modulated according to a distance from the light source to a sub-electrode group to which a voltage is to be applied and an image signal.

8. The illumination unit according to claim 4, wherein the first transparent substrate or the second transparent substrate has a plurality of projections extending in a direction parallel to a normal to a side surface facing the light source of side surfaces of the first transparent substrate or the second transparent substrate.

9. The illumination unit according to claim 5, wherein a section in a direction orthogonal to a projection extending direction of each of the projections has a rectangular shape, a trapezoidal shape, or a triangular shape.

10. The illumination unit according to claim 5, wherein a height of each of the projections is smaller at a shorter distance from the light source and larger at a longer distance from the light source.

11. The illumination unit according to claim 8, wherein the height of each of the projections is zero closest to the light source.

12. The illumination unit according to claim 1, wherein the light modulation layer exhibits transparency when a voltage is not applied to the electrode and exhibits a scattering property when a voltage is applied to the electrode.

13. The illumination unit according to claim 1, wherein the light modulation layer is configured by including liquid crystal molecules and a polymer, the liquid crystal molecules having faster response speed with respect to an electric field generated by the electrode, the polymer having slower response speed with respect to the electric field generated by the electrode.

14. The illumination unit according to claim 10, wherein the liquid crystal molecules and the polymer are aligned in an extending direction of the comb teeth of the first electrode when a voltage is not applied to the electrode.

15. The illumination unit according to claim 10, wherein the liquid crystal molecules and the polymer are aligned in a direction of a normal to the first transparent substrate when a voltage is not applied to the electrode.

16. A display comprising:
a display panel including a plurality of pixels arranged in a matrix and being driven based on an image signal; and
an illumination unit illuminating the display panel,
the illumination unit including
a first transparent substrate and a second transparent substrate disposed to be separated from and face each other,
a light source emitting light to an end surface of the first transparent substrate or the second transparent substrate,
an electrode disposed on a surface of the first transparent substrate or the second transparent substrate and generating an electric field in a direction parallel to the surface of the first transparent substrate,
a light modulation layer disposed in a gap between the first transparent substrate and the second transparent substrate and exhibiting a scattering property or transparency with respect to light from the light source, depending on magnitude of the electric field, and
a drive circuit applying a voltage to the electrode,
wherein the electrode includes a plurality of separately driven sub-electrode groups, each sub-electrode group including a first electrode having comb teeth which extend in a first direction and a second electrode having comb teeth which are disposed alternately with the comb teeth of the first electrode,
wherein a plurality of the sub-electrode groups are arranged in a direction normal to a side surface facing the light source of side surfaces of the first transparent substrate such that the drive circuit may independently apply voltages to the respective sub-electrode groups according to a distance from the light source.

* * * * *